United States Patent
Tan et al.

(10) Patent No.: US 11,996,795 B2
(45) Date of Patent: May 28, 2024

(54) MOTOR ALIGNMENT CONTROL

(71) Applicant: POWER INTEGRATIONS, INC., San Jose, CA (US)

(72) Inventors: John Emmanuel Atienza Tan, Antipolo (PH); Jhaebhee Mark Quiroz Calderon, Pasig (PH); Emmanuel Belen Antonio, Santo Tomas (PH); John Henry Rementilla Puente, Pasay (PH)

(73) Assignee: POWER INTEGRATIONS, INC., San Jose, CA (US)

( * ) Notice: Subject to any disclaimer, the term of this patent is extended or adjusted under 35 U.S.C. 154(b) by 0 days.

(21) Appl. No.: 17/706,203

(22) Filed: Mar. 28, 2022

(65) Prior Publication Data

US 2023/0327588 A1   Oct. 12, 2023

(51) Int. Cl.
*H02P 6/26* (2016.01)

(52) U.S. Cl.
CPC ..................... *H02P 6/26* (2016.02)

(58) Field of Classification Search
CPC .. H02P 6/26; H02P 27/06; H02P 27/16; H02P 6/22
See application file for complete search history.

(56) References Cited

U.S. PATENT DOCUMENTS

| | | |
|---|---|---|
| 4,777,579 A | 10/1988 | Jahns et al. |
| 6,107,851 A | 8/2000 | Balakrishnan et al. |
| 6,249,876 B1 | 6/2001 | Balakrishnan et al. |
| 6,337,788 B1 | 1/2002 | Balakrishnan et al. |
| 6,580,593 B2 | 6/2003 | Balakrishnan |
| 7,242,160 B2 | 7/2007 | Wang et al. |
| 7,397,231 B2 | 7/2008 | Wang |

(Continued)

FOREIGN PATENT DOCUMENTS

| | | | |
|---|---|---|---|
| CN | 104167962 A | * | 11/2014 |
| CN | 111064395 A | | 4/2020 |

(Continued)

OTHER PUBLICATIONS

Power Integrations, "Application Note AN-87 Bridge Switch Family 1-PHASE BLDC Motor Drive", 14 pages.

(Continued)

*Primary Examiner* — Bickey Dhakal
(74) *Attorney, Agent, or Firm* — Karina Martha G. Li; POWER INTEGRATIONS, INC.

(57) ABSTRACT

A motor drive system for use with a motor comprising a first high-side switch coupled to a high voltage bus and the motor. A first low-side switch coupled to the motor and a return, a turn ON and turn OFF of the first high-side switch and the first low-side switch provides a phase current for the motor. A system controller configured to receive a phase current sense signal representative of the phase current of the motor and configured to begin an alignment sequence to align the motor to a goal alignment position, wherein during the alignment sequence at least one of the first high-side switch or the first low-side switch is turned ON and OFF having an alignment duty ratio, and the system controller is configured to end the alignment sequence in response to a sensed decrease in the phase current sense signal or a first duration has elapsed.

19 Claims, 8 Drawing Sheets

(56) References Cited

U.S. PATENT DOCUMENTS

| | | |
|---|---|---|
| 7,952,341 B2 | 5/2011 | Schulz |
| 7,961,484 B2 | 6/2011 | Lalithambika et al. |
| 7,990,127 B2 | 8/2011 | Saint-Pierre |
| 8,368,370 B2 | 2/2013 | Moorish |
| 9,246,392 B2 | 1/2016 | Balakrishnan et al. |
| 9,366,717 B2 | 6/2016 | Ratz |
| 9,450,478 B1 | 9/2016 | Djenguerian et al. |
| 9,515,588 B2 | 12/2016 | Bateman et al. |
| 9,774,248 B2 | 9/2017 | Saint-Pierre et al. |
| 9,787,300 B2 | 10/2017 | Siebler |
| 9,948,294 B2 | 4/2018 | Peter et al. |
| 10,088,854 B2 | 10/2018 | Pham et al. |
| 10,171,071 B2 | 1/2019 | Ratz |
| 10,181,813 B2 | 1/2019 | Baurle et al. |
| 10,205,394 B2 | 2/2019 | Pham et al. |
| 10,218,282 B1 | 2/2019 | Moore et al. |
| 10,461,733 B2 | 10/2019 | Fink et al. |
| 10,826,375 B2 | 11/2020 | Wang et al. |
| 10,886,870 B2 | 1/2021 | Baurle et al. |
| 10,998,843 B2 | 5/2021 | Baeurle |
| 2001/0026138 A1* | 10/2001 | Lim .......... H02P 6/26 318/701 |
| 2006/0197478 A1 | 9/2006 | Wang et al. |
| 2011/0291597 A1* | 12/2011 | Kern .......... H02P 6/20 318/400.11 |
| 2014/0055066 A1 | 2/2014 | Harada |
| 2015/0128658 A1* | 5/2015 | Jang .......... D06F 37/304 318/400.11 |
| 2016/0282005 A1* | 9/2016 | Kim .......... F24F 11/77 |
| 2016/0315568 A1* | 10/2016 | Ogawa .......... H02P 27/085 |
| 2017/0310255 A1* | 10/2017 | Zheng .......... H02P 6/16 |
| 2018/0159450 A1* | 6/2018 | Aoki .......... H02P 6/21 |
| 2018/0302017 A1 | 10/2018 | Baurle et al. |
| 2019/0013757 A1 | 1/2019 | Leman et al. |
| 2020/0021284 A1 | 1/2020 | Thalheim |

FOREIGN PATENT DOCUMENTS

| | | | |
|---|---|---|---|
| EP | 3413458 A1 * | 12/2018 | .......... H02P 27/06 |
| EP | 3955455 A1 | 2/2022 | |
| GB | 2500013 A * | 9/2013 | .......... H02P 23/00 |
| WO | 2021126826 A1 | 6/2021 | |

OTHER PUBLICATIONS

Power Integrations, "Reference Design Report for a 30 W 1-Phase Inverter Using Bridgeswitch BRD1260C Rev. 1.2", Mar. 23, 2021, 48 pages.

Wang, Weizi, et al., "Sensorless Control Technology for Single Phase BLDCM Based on the Winding Time-Sharing Method", 5 Pages, 1732-1736.

Wang, Weizi, et al., "Starting Methods for Hall-Less Single Phase BLDC Motor", 5 Pages, 1605-1609.

PCT Application No. PCT/US2023/060886; International Search Report and Written Opinion dated Apr. 25, 2023; 16 pages.

J. M. Calderon, et al., "Sensorless Control Method for Single-Phase BLDC Motors Based on Phase Current Information," 2022 IEEE Applied Power Electronics Conference and Exposition (APEC), Mar. 19, 2022, pp. 1598-1601, doi: 10.1109/APEC43599.2022.9773632.

* cited by examiner

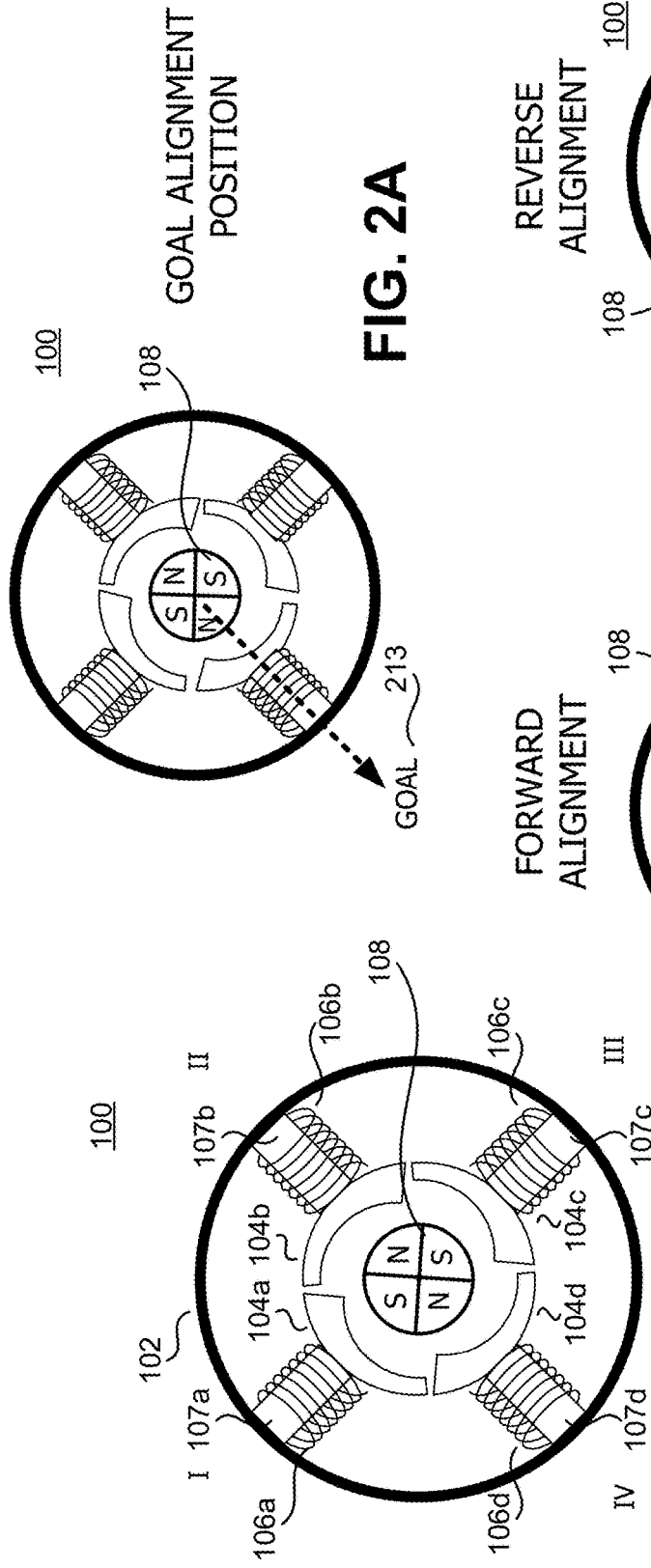
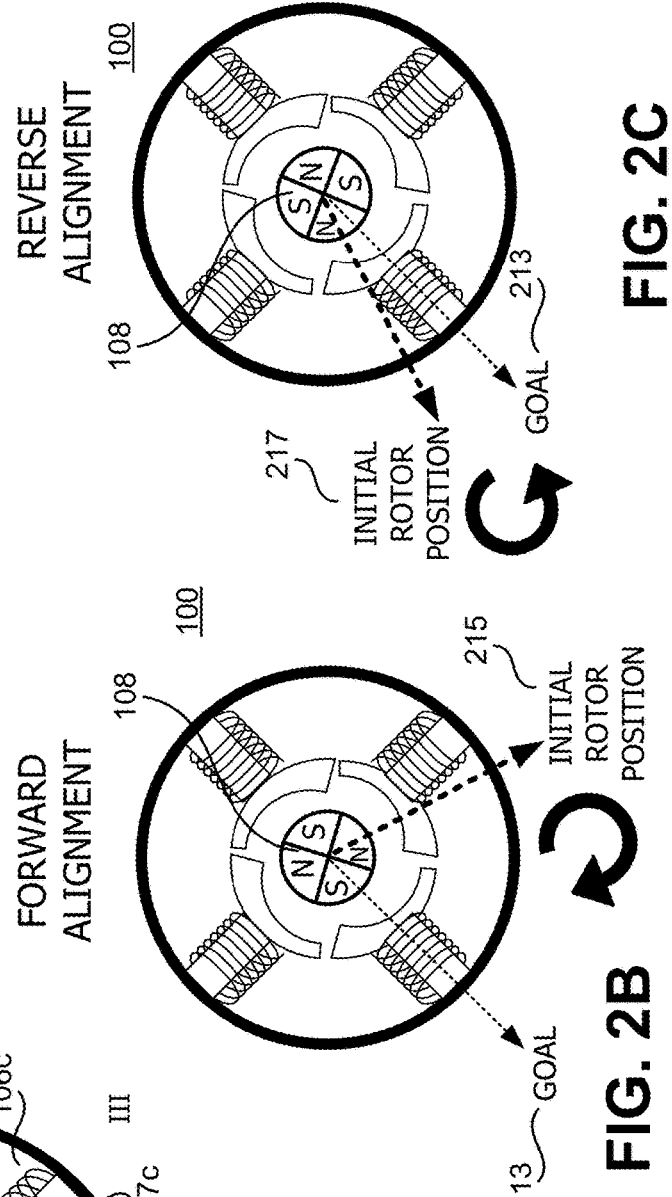

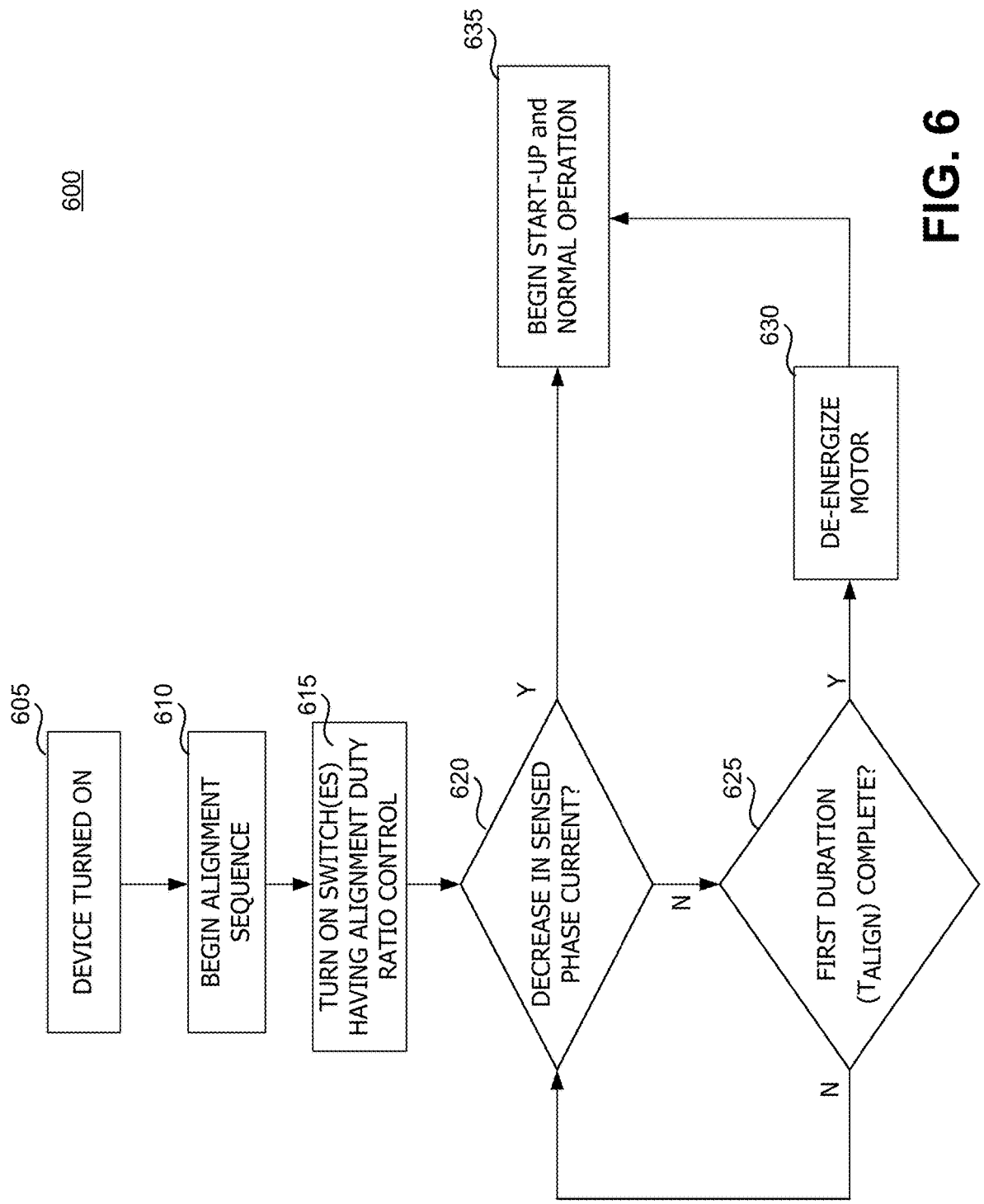

MOTOR ALIGNMENT CONTROL

BACKGROUND OF THE INVENTION

Field of the Invention

The present invention relates generally to motors drivers.

Discussion of the Related Art

Household and industrial appliances such as ventilation fans, cooling systems, refrigerators, dishwasher, washer/dryer machines, and many other white products/goods typically utilize electric motors that transfer energy from an electrical source to a mechanical load. Electrical energy for driving the electric motors is provided through a drive system which draws electrical energy from an electrical source, e.g. from an ac low frequency source. The electrical energy received from the electrical source is processed through a power converter and converted to a desired form of electrical energy that is supplied to the motor to achieve the desired mechanical output. The desired mechanical output of the motor may be for example the speed of the motor, the torque, or the position of a motor shaft.

The function of a power converter in a motor drive includes providing the input electrical signals to the motor, such as voltage, current, frequency, and phase, for a desired mechanical output load motion (e.g., spin/force) on the motor shaft. The power converter in one example may be an inverter transferring a direct current (dc) input to an alternating current (ac) output of desired voltage, current, frequency, and phase. The power converter regulates the energy flow in response to one or more signals that are received from a sensor block. The sensed signals are sent to a controller in a closed loop system by comparing the sensed values to the desired values. The controller adjusts the input electrical signals to the motor in response to the comparison of the sensed values to the desired values to maintain the desired mechanical output load motion.

Brushless dc (BLDC) motors, which are known for their high reliability and efficiency, are becoming a popular choice for replacing brushed dc and ac motors. They are widely used in household appliances, such as refrigerators, air conditioners, vacuum cleaners, washers/driers, and other white goods, and power tools such as electric drills, or other electric tools. A BLDC motor utilizes a power converter, which typically includes an inverter stage of one or more half-bridge modules. The half-bridge modules generally include power switches and their respective switch controllers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a cross-section of a motor, in accordance with teachings of the present disclosure.

FIG. 2A is a cross-section of a motor with a rotor in a goal alignment position, in accordance with teachings of the present disclosure.

FIG. 2B is a cross-section of the motor with a rotor in forward alignment, in accordance with teachings of the present disclosure.

FIG. 2C is a cross-section of the motor with a rotor in reverse alignment, in accordance with teachings of the present disclosure.

FIG. 6 is a flow diagram illustrating a method of motor alignment control, in accordance with teachings of the present disclosure.

Figure 3:
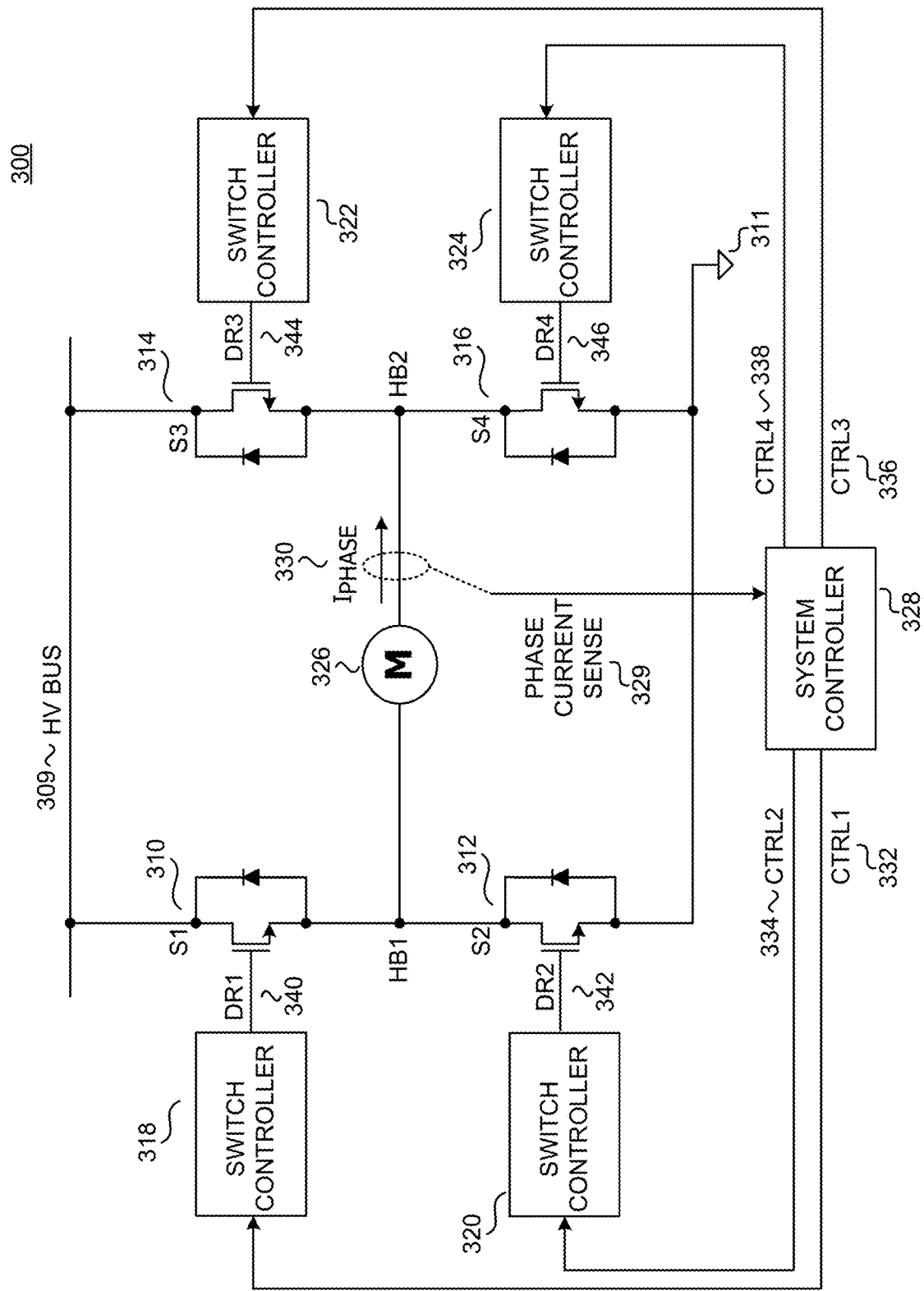
FIG. 3 is one example of a motor drive system with motor alignment control, in accordance with teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the Brushless dc (BLDC) motors are becoming a popular choice for replacing brushed dc and ac motors. They are widely used in household appliances, such as refrigerators, air conditioners, vacuum cleaners, washers/driers, fans, pumps and other white goods, and power tools such as electric drills, or other electric tools. A BLDC motor utilizes a power converter, which typically includes an inverter stage of one or more half-bridge modules. The half-bridge modules generally include power switches and their respective switch controllers which drive the power switches ON or OFF. In another example, the BLDC motor utilizes a full-bridge power converter, which also includes power switches and their respective switch controllers which drive the power switches ON or OFF. A motor drive system for a BLDC motor also generally includes a system controller which receives sense signals regarding properties of the motor and controls the turn ON and turn OFF of the power switches to control the desired motion of the rotor shaft of the BLDC motor.

Single-phase BLDC motors are further desirable due to their low cost, however, single-phase BLDC motors have low starting torque and may exhibit null-points which makes it difficult for the motor to run from a stationary position. Knowledge of the initial rotor position is generally preferred to apply start-up techniques to turn ON the motor. Hall effect sensors are often used to determine the initial position of a single-phase BLDC motor. However, Hall effect sensors add to the cost and size of the overall motor drive system.

Embodiments of the present disclosure utilize a motor with a stator core base such that there is an asymmetric air-gap (also sometimes referred to as a tapered air-gap) between the stator core base and the rotor. The asymmetric air-gap of the stator core base can offset the effects of null-points for the single-phase BLDC motor. Due to the removal of the Hall effect sensors for implementing sensorless control, the initial position of the rotor is unknown. During the start of operation, the rotor is aligned to a goal position for proper start-up control. However, the asymmetric construction of the stator core to provide the asymmetric air-gap may cause different responses based on the rotor movement during alignment. The different responses may be interpreted as wobbling of the motor. Wobbling of the motor refers to an undesired back and forth movement, or oscillation, of the rotor as the rotor is aligned to a goal position with the stator. Without mitigation, the wobbling (e.g. wobble) may cause incorrect start-up operation of the motor as the rotor is unable to be aligned to the goal position. In general, wobble in the rotor is due to the overshooting of the goal alignment position.

Embodiments of the present disclosure include a motor drive system which positions the rotor with respect to the stator of the single-phase motor to a goal alignment position. The duration which the motor drive system is aligning the rotor to the goal alignment position may be referred to as the alignment sequence. During the alignment sequence, the motor drive system applies an alignment duty ratio control to turn ON and turn OFF at least one of the power switches coupled to the single-phase motor. Alignment duty ratio control refers to controlling the turn ON and OFF at least one of the power switches having a duty ratio between a first value and a second value to control the phase current of the single-phase motor. The first value and second value may be selected to reduce wobble or other undesired alignment response. In one example, the second value is greater than the first value, and the duty ratio of at least one of the power switches increases to provide a controlled increase of phase current during the alignment sequence. In another example, the first and second value may be substantially equal. Further, a decrease or dip in the phase current may indicate that the rotor has overshot the goal alignment position. The motor drive system senses the phase current and monitors the phase current for the decrease to determine that the rotor is near the goal alignment position. The motor drive system ends the alignment sequence and determines the rotor is in the goal alignment position after the decrease or dip in phase current has been sensed or after a first duration $T_{ALIGN}$ has passed or elapsed.

Referring first to FIG. 1, a cross-section of a motor 100 is illustrated including a stator yoke 102, stator core base 104a, 104b, 104c, and 104d, windings 106a, 106b, 106c, 106d, stator core arm 107a, 107b, 107c, 107d, and rotor 108. It should be appreciated that the rotor 108 includes a rotor shaft (not shown) which would protrude out of the page. Motor 100 illustrates one example of a 4-pole, single-phase brushless dc (BLDC) motor, however, it should be appreciated that other single-phase BLDC motors may be utilized with embodiments of the present disclosure.

The stator and rotor are parts of an electric motor, with the stator forming the stationary portion of the motor while the rotor forms the rotating portion of the motor. In one example, the rotor is within the stator, and may be referred to as an in-runner type motor. An out-runner type motor is an example which the rotor is outside of the stator, and the stator is in the center. The stator generates the magnetic field which causes the rotor to rotate. In FIG. 1, the stator includes the stator yoke 102, stator core bases 104a, 104b, 104c, and 104d, windings 106a, 106b, 106c, 106d, and stator core arms 107a, 107b, 107c, 107d. The stator yoke 102 surrounds the stator core bases 104a, 104b, 104c, and 104d, windings 106a, 106b, 106c, 106d, and stator core arms 107a, 107b, 107c, 107d and provides protective covering of the inner portions of the stator. In general, the stator yoke 102 is formed of a magnetic material, such as cast iron or steel. The cross-section of the stator yoke 102 is substantially circular, but it should be appreciated that other shapes could be used.

The motor 100 shown in FIG. 1 can be divided into four quadrants: I, II, III and IV. The quadrants may be the distance between adjacent poles. In each quadrant, the stator core includes a stator core base (104a, 104b, 104c, and 104d) and a stator core arm (107a, 107b, 107c, and 107d). The stator core base (104a, 104b, 104c, and 104d) and stator core arm (107a, 107b, 107c, and 107d) hold the windings of the motor in place and transmit magnetic flux. As shown in quadrant I, the stator core base 104a has a curved shape and the thickness along the curve of the stator core base 104a varies. The curve of the stator core base 104a generally follows the curve the stator yoke 102. At one end of the curve, the stator core base 104a is thinner than the other end of the curve. The variable thickness results in an asymmetric air-gap of the motor 100. The stator core may be made of stacked laminated steel, however it should be appreciated that other materials could be utilized.

Stator core arm 107a radially protrudes from stator core base 104a towards the stator yoke 102. Wound around stator core arm 107a is winding 106a. It should be appreciated that the structure of the stator core bases, stator core arms, and windings in quadrants II, III and IV are similar to the structure described with respect to quadrant I. However, for the 4-pole motor 100 shown, the windings for opposite quadrants are wound in the same direction while windings for adjacent quadrants are wound in the counter direction.

For example, windings 106a and 106c in quadrants I and III are wound in the same direction around stator core arms 107a and 107c. Similarly, windings 106b and 106d in quadrants II and IV are wound in the same direction around stator core arms 107b and 107d. However, windings 106b and 106d of quadrants II and IV are wound in the opposite direction as windings 106a and 106c of quadrants I and III. In general, adjacent poles have windings wound in the opposite, or counter, direction.

The rotor 108 is substantially at the center of the motor, at what is generally referred to as the axis of the motor. The cross-section of the rotor 108 shown is circular. In one example, rotor 108 is a permanent magnet. The pole markings of "N" for North and "S" for South indicates the polarity of the rotor 108. For the example shown, rotor 108 has four poles, two North and two South poles. In operation, windings 106a, 106b, 106c, and 106d conduct current which generates a magnetic flux that causes movement and rotation of the rotor 108.

FIG. 2A illustrates a goal alignment position of the stator with respect to the rotor 108. In one example, the goal alignment position 213 represents the target rotor position such that the motor drive system may apply start-up techniques to fully turn ON the motor 100. As shown in the example of FIG. 2A, the North "N" polarities of rotor 108 is aligned towards the stator core arm 107d of quadrant IV and stator core arm 107b of quadrant II of motor 100 in the goal alignment position 213. However, it should be appreciated that this is one example goal alignment position and other goal alignment positions could be utilized.

FIG. 2B illustrates the motor 100 position in forward alignment with respect to the stator. For the example shown, the North "N" polarities of rotor 108 are almost aligned with stator core arm 107c of quadrant III and stator core arm 107a of quadrant I in the initial rotor position 215. As such, the rotation of the rotor 108 to reach the goal alignment position 213 from initial rotor position 215 would be clockwise. In one example, this clockwise rotation is referred to as forward alignment.

FIG. 2C illustrates the motor 100 position in reverse alignment with respect to the stator. For the example shown, the North "N" polarities of rotor 108 are aligned just past the stator core arm 107d of quadrant IV and stator core arm 107b of quadrant II in initial rotor position 217. As such, the rotation of the rotor 108 to reach the goal alignment position 213 from initial rotor position 217 would be counterclockwise. In one example, this counterclockwise rotation is referred to as reverse alignment.

As will be discussed further, the alignment sequence applied by the motor drive system includes an alignment duty ratio control to turn ON and turn OFF at least one of the power switches of the motor drive system to control phase current of the motor. In another example, the first value and the second value are selected such that at least one of the power switches are turned ON and OFF to provide a controlled ramping increase of the phase current of the motor. When the motor drive system is aligning the rotor, that period of time is referred to as the alignment sequence. In general, wobble of the rotor may be due to overshooting the goal alignment position of the rotor. For reverse alignment, mitigating or reducing wobble may be achieved by a gentle pull (e.g. movement) of the rotor to prevent this overshoot by applying the alignment duty ratio control. When the rotor is in reverse alignment with respect to the goal alignment position, the alignment duty ratio control is generally applied for the entirety of a first duration $T_{ALIGN}$ for the rotor to reach the goal alignment position. As such, the duration of the alignment sequence is generally the first duration $T_{ALIGN}$. The alignment duty ratio control refers to turning ON and OFF at least one of the power switches of the motor drive system with a duty ratio between a first value and a second value. In one example, the second value is greater than the first value and the duty ratio of at least one of the power switches increases between the first value and the second value. The first and second values are selected to reduce the effects of wobbling or other undesired alignment response. In one example, the value of the first duty ratio is selected to not be too high such that the rotor 108 will overshoot the goal alignment position 213. Too high of a value for the first duty ratio could cause overshoot of the rotor 108 to the goal alignment position 213.

However, in forward alignment, the back electromotive force (back-EMF), also referred to as counter EMF, has a trapezoidal/quasi-sinusoidal waveform when the rotor has reached the goal alignment position. That quasi-sinusoidal waveform is impressed and can be observed in the phase current of the motor. In particular, a decrease or dip due to the back-EMF can be observed in the phase current when the rotor has reached the goal alignment position. As such, embodiments of the present disclosure include a motor drive system which senses the phase current and determines that the rotor is in the goal alignment position when the decrease or dip has been observed. Further, in general, the back-EMF decrease occurs prior to the end of the first duration $T_{ALIGN}$. As such, the overall duration of the alignment sequence is shorter than the first duration $T_{ALIGN}$. In other words, alignment to the goal alignment position such that start-up can proceed can occur more quickly when the rotor is in forward alignment. It should be appreciated that the alignment duty ratio control is also applied in forward alignment. In one example, the value of the second duty ratio is selected to be high enough to pull the rotor 108 forward into the goal alignment position 213.

FIG. 3 illustrates a motor drive system 300 with motor alignment control. In particular, motor drive system 300 is a single-phase motor drive system including power switch S1 310, power switch S2 312, power switch S3 314 and power switch S4 316 which are driven ON and OFF by switch controllers 318, 320, 322, and 324, respectively. As shown, each switch is represented by an n-type metal-oxide-semiconductor field effect transistor (MOSFET) with an anti-parallel diode, however, it should be appreciated that other switches may be used. For example, the power switch may be a transistor such as a bipolar junction transistor (BJT), an insulated-gate bipolar transistor (IGBT), a gallium nitride (GaN) based transistor, or a silicon carbide (SiC) based transistor. In another example the power switch may be a cascode switch including a normally-on first switch and a normally-off second switch coupled together in a cascode configuration. The first switch may generally be a GaN or SiC based transistor while the second switch may be a MOSFET, BJT, or IGBT.

As shown in FIG. 3, power switch S1 310, power switch S2 312, power switch S3 314, power switch S4 316, and motor 326 are coupled together in a full-bridge configuration. For example, power switch S1 310 and power switch S3 314 are coupled to the high-voltage (HV) bus 309 and may be referred to as high-side switches. Power switch S2 312 and power switch S4 316 are coupled to return 311 and may be referred to as low-side switches. The node between power switch S1 310 and power switch S2 312 is referred to as mid-point node HB1 while the node between power switch S3 314 and power switch S4 316 is referred to as mid-point node HB2. As shown, motor 326 is coupled between the mid-point node HB1 and mid-point node HB2.

In other words, power switch S1 310 and power switch S2 312 comprise one half-bridge while power switch S3 314 and power switch S4 316 comprise another half-bridge. The motor 326 is coupled between the mid-point node HB1 and mid-point node HB2 of each half-bridge.

Switch controller 318 outputs drive signal DR1 340 to turn ON and turn OFF power switch S1 310 in response to control signal CTRL1 332. Switch controller 320 outputs drive signal DR2 342 to turn ON and turn OFF power switch S2 312 in response to control signal CTRL2 334. Switch controller 322 outputs drive signal DR3 344 to turn ON and turn OFF power switch S3 314 in response to control signal CTRL3 336. Switch controller 324 outputs drive signal DR4 346 to turn ON and turn OFF power switch S4 316 in response to control signal CTRL4 338. Drive signals DR1 340, DR2 340, DR3 344, and DR4 346 may be voltage signals or current signals. Further, drive signals DR1 340, DR2 342, DR3 344, and DR4 346 may be rectangular pulse waveforms with varying durations of "high" and "low" sections, with high sections corresponding to turning ON the power switch and low sections corresponding with turning OFF the power switch. Switch controllers 318, 320, 322, 324 may output their respective drive signals in response to the respective control signals received from system controller 328.

Switch controllers 318, 320, 322, and 324 can each be formed as part of an integrated circuit that is manufactured as either a hybrid or monolithic integrated circuit. Further, each switch controller may also be integrated in a single integrated circuit with its respective power switch and may be packaged together. However, it should be appreciated that the switch controller and its respective power switch may be in separate integrated circuits but still in the same package. Or further, the switch controller and its respective power switch may be in separate integrated circuits and separate packages. In another embodiment, shown further with respect to FIG. 7, power switches S1 310, S2 312, along with their respective switch controllers 318, 320 may form an integrated half-bridge module while switches S3 314, S4, 316 along with their respective switch controllers 322, 324 may form another integrated half-bridge module.

Switch controllers 318, 320, 322, and 324 are controlled by a system controller 328 to drive the operation of motor 326. In one example, motor 326 is brushless single-phase motor which may be included in, for example, an electric appliance, power tool, fan, or the like. In operation, the switches S1 310, S2 312, S3 314, and S4 316 with their respective switch controllers 318, 320, 322, 324 provide the input electrical signals (such as voltage, current, frequency, and phase for the desired mechanical output load motion) to the motor 326 from the electrical energy supplied by the HV bus 309. The switching properties of switches S1 310, S2 312, S3 314, and S4 316 are controlled to regulate the energy flow to the motor 326. In other words, the switch controllers 318, 320, 322, 324 adjust the output to the motor 326 to maintain the target operation of the motor 326.

The system controller 328 is configured to receive one or more command signals from a user to control the operation of motor 326. For example, system controller 328 may receive an "ON" command to turn on and begin operation of motor 326, or conversely, may receive an "OFF" command to stop operation of motor 326. Further, the system controller 328 is also coupled to receive one or more sense signals representative of properties of the motor 326. The system controller 328 utilizes these sense signals to control the desired mechanical output of the motor 326. Example desired mechanical outputs of the motor may be for example the speed of the motor, the torque, or the position of a motor shaft.

In response to command signals from a user and/or sense signals regarding the properties of the motor 326, the system controller 328 outputs control signal CTRL1 332, control signal CTRL2 334, control signal CTRL3 336, and control signal CTRL4 338 to switch controllers 318, 320, 322, 324, respectively, to control the turn ON and turn OFF of power switches S1 310, S2 312, S3 314, and S4 316. Control signal CTRL1 332, control signal CTRL2 334, control signal CTRL3 336, and control signal CTRL4 338 are representative of a command to turn ON or turn OFF the respective power switches, power switches S1 310, S2 312, S3 314 and S4 316. Further, control signal CTRL1 332, control signal CTRL2 334, control signal CTRL3 336, and control signal CTRL4 338 may also be representative of switching properties of the respective power switches. Switching properties may include the on-time of the power switch, off-time, the duty ratio (typically the ratio of the on time of the switch to the total switching period), the switching frequency, or the number of pulses per unit time of the power switch. Further, control signal CTRL1 332, control signal CTRL2 334, control signal CTRL3 336, and control signal CTRL4 338 may be voltage signals or current signals. In response to the respective received control signal, switch controllers 318, 320, 322, and 324 drive the turn ON or turn OFF of the respective power switches.

During normal operation, the high-side switch of one half-bridge is paired with the low-side switch of the other half-bridge to alternate the direction of phase current $I_{PHASE}$ 330. For example, power switches S1 310 and S3 314 are high-side switches while power switches S2 312 and S4 316 are low-side switches. High-side switch S1 310 is paired with low-side switch S4 316 to control the direction of phase current $I_{PHASE}$ 330 from mid-point HB1 to mid-point HB2. Similarly, high-side switch S3 314 is paired with low-side switch S2 312 to control the direction of phase current $I_{PHASE}$ 330 from mid-point HB2 to mid-point HB1.

The low-side switches, e.g. power switches S2 312 and S4 316, may be considered polarity switches (or could be referred to as direction switches) as the turn ON and turn OFF of the low-side switches determines the direction of the phase current $I_{PHASE}$ 330. The high-side switches, e.g. power switches S1 310 and S4 316, may be considered modulation switches as the turn ON and turn OFF of the high-side switches can control the magnitude of current provided to the motor 326 and ergo control the speed of the motor 326. The frequency of switching for the low-side switches, S2 312 and S4 316, is slower than the frequency of switching for the high-side switches, S1 310 and S3 314. As such, the low-side switches, S2 312 and S4 316, may also be referred to as low frequency switches while the high-side switches, S1 310 and S3 314, may be referred to as high frequency switches. In another embodiment, the paired high-side switch could be turned ON and OFF with the same switching frequency with its paired low-side switch.

When the high-side switches, S1 310 and S3 314, are utilized as the modulation switches while the low-side switches, S2 312 and S4 316, are the polarity switches, this may be referred to as high-side modulation as the turn ON and OFF of the high-side switches controls the motor. Low-side modulation may refer to utilizing the low-side switches, S2 312 and S4 316, as the modulation switches to control the motor. For that example of low-side modulation, the high-side switches, S1 310 and S3 314, may be polarity switches.

As such, the system controller 328, along with switch controllers 318, 320, 322, and 324, adjust the output to the motor 326 to maintain the target operation of the motor 326. In one example, the system controller 328 may be included in a variety of microcontrollers, microprocessors, digital signal processor (DSP) controllers, or the like.

In embodiments of the present disclosure, system controller 328 receives a phase current sense signal 329. The phase current sense signal 329 is representative of the phase current $I_{PHASE}$ 330 of motor 326 and may be a voltage or current signal. In operation, the system controller 328 receives a command to turn ON and begin operation of the motor 326. The system controller 328 begins an alignment sequence to align the motor 326 to a goal alignment position as discussed with respect to FIGS. 2A, 2B, and 2C. In one example, during the alignment sequence, the system controller 328 outputs the control signals CTRL1 332, CTRL2 334, CTRL3 336, and CTRL4 338 such that the envelope of the phase current $I_{PHASE}$ 330 waveform increases linearly. In other words, the envelope of the phase current $I_{PHASE}$ 330 waveform has a ramping shape. Further, during the alignment sequence, the system controller 328 outputs the control signals CTRL1 332, CTRL2 334, CTRL3 336, and CTRL4 338 such that the phase current $I_{PHASE}$ 330 flows in one direction. For the example shown, during the alignment sequence, phase current $I_{PHASE}$ 330 flows from mid-point node HB1 to mid-point node HB2. Although, it should be appreciated that the power switches could be controlled such that the phase current $I_{PHASE}$ 330 flows from mid-point node HB2 to mid-point node HB1.

In embodiments, during the alignment sequence, the system controller 328 controls the duty ratio of at least one of the power switches to provide the phase current $I_{PHASE}$ 330 to the motor 326 in a controlled manner. In one example, the system controller 328 controls the duty ratio of at least one of the power switches to increase the phase current $I_{PHASE}$ 330 in a controlled manner. The duty ratio is typically the ratio of the on time of the switch to the total switching period, with the total switching period being the sum of the on time and the off time of the switch. In other words, during the alignment sequence, the system controller 328 controls at least one of the power switches with an alignment duty ratio control. Said differently, during the alignment sequence the system controller 328 controls the duty ratio of at least one of the power switches. During the alignment sequence, the system controller 328 provides the alignment duty ratio control and controls the turn ON and turn OFF of at least one of the power switches with a duty ratio between a first value and a second value. The first value and the second value are selected to reduce or minimize the effects of wobbling or other undesired alignment response. Wobbling may be referred to as an undesired back and forth movement or oscillation of the rotor, particularly during alignment of the rotor with the stator. In one example, the value of the first duty ratio is selected to not be too high such that the rotor will not overshoot the goal alignment position. Too high of a value for the first duty ratio could cause overshoot of the rotor to the goal alignment position. Further, the value of the second duty ratio is selected to be high enough to pull the rotor forward into the goal alignment position. In one example, the second value is greater than the first value. The increase of the duty ratio from the first value to the second value may be linear or exponential. In another example, the first value and second value are substantially equal.

Figure 4A:
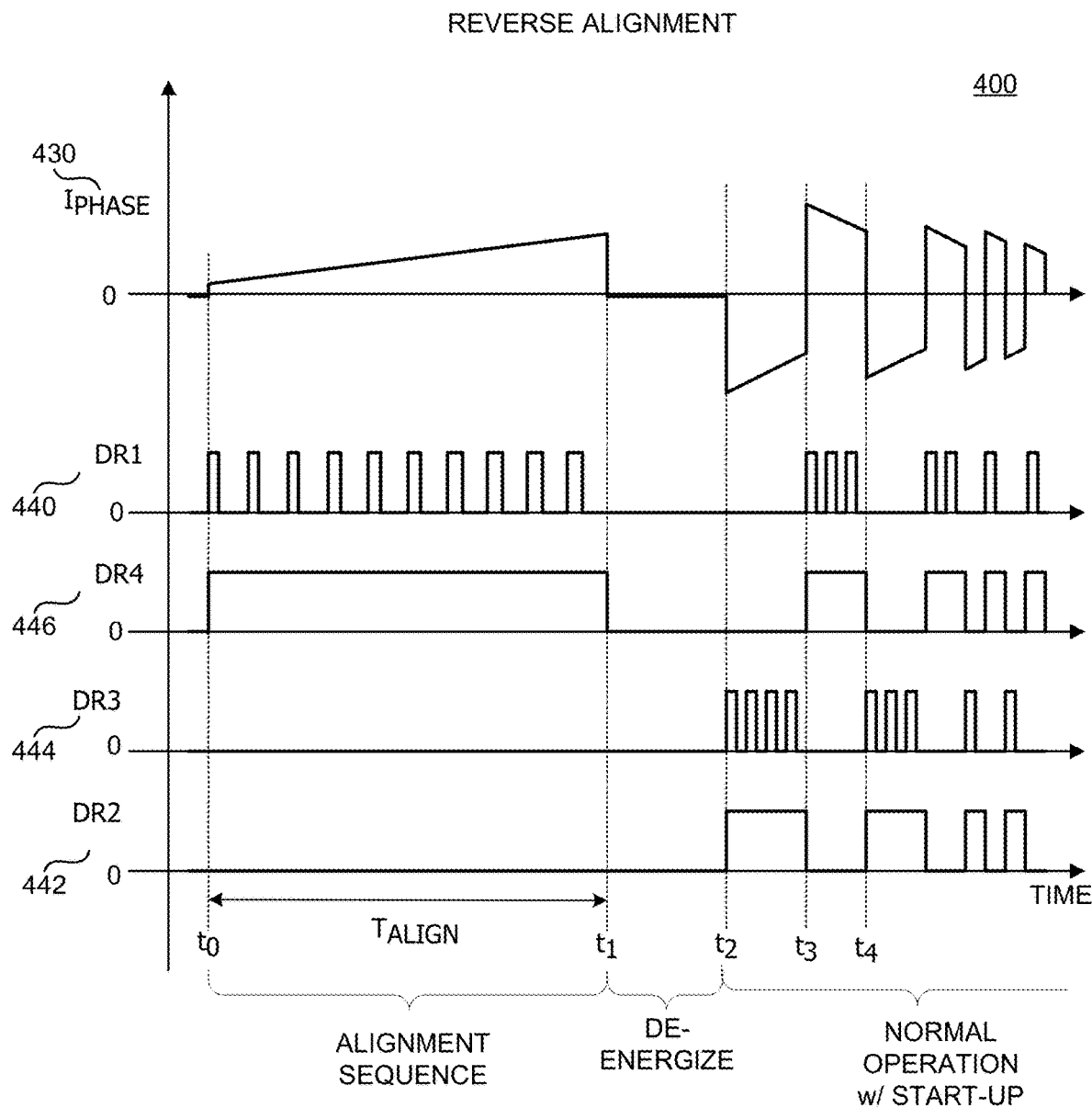
FIG. 4A is a timing diagram of example waveforms of the motor drive control of FIG. 3 in which the motor is in reverse alignment, in accordance with teachings of the present disclosure.
Figure 5A:
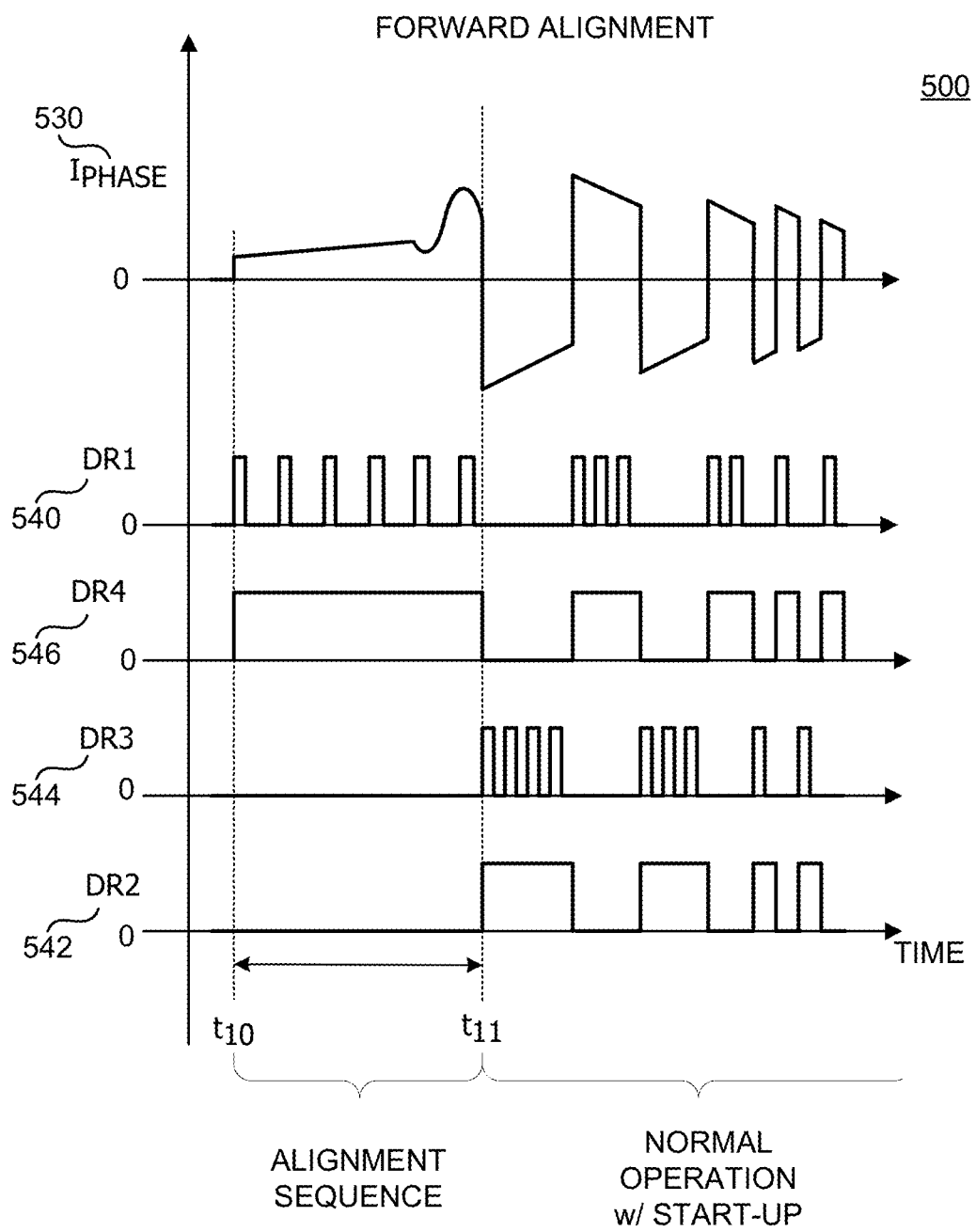
FIG. 5A is a timing diagram of example waveforms of the motor drive system of FIG. 3 in which the motor is in forward alignment, in accordance with teachings of the present disclosure.

In one embodiment, as will be further discussed with respect to FIGS. 4A and 5A, system controller 328 sends control signals to the switch controllers such that power switches S2 312 and S3 314 are turned OFF while power switch S4 316 is turned ON for the entirety of the alignment sequence. Power switch S1 310 is turned ON with an increasing duty ratio during the alignment sequence. In one example, the duty ratio may increase from 2% to 5%. As a result, the phase current $I_{PHASE}$ 330 increases with the increasing duty ratio of power switch S1 310 and the direction of phase current $I_{PHASE}$ 330 is from mid-point HB1 towards mid-point HB2. In operation, when the power switch S1 310 is on during the alignment sequence, the phase current $I_{PHASE}$ 330 flows from mid-point HB1 towards mid-point HB2.

Alternatively, it should be appreciated that the power switches may be controlled such that the direction of the phase current $I_{PHASE}$ 330 is from mid-point HB2 towards mid-point HB1. For that direction, the system controller 328 sends control signals to the switch controllers such that power switches S1 310 and S4 316 are turned OFF while power switch S2 312 is turned ON for the entirety of the alignment sequence. Power switch S3 314 is turned ON with an increasing duty ratio during the alignment sequence.

Figure 4B:
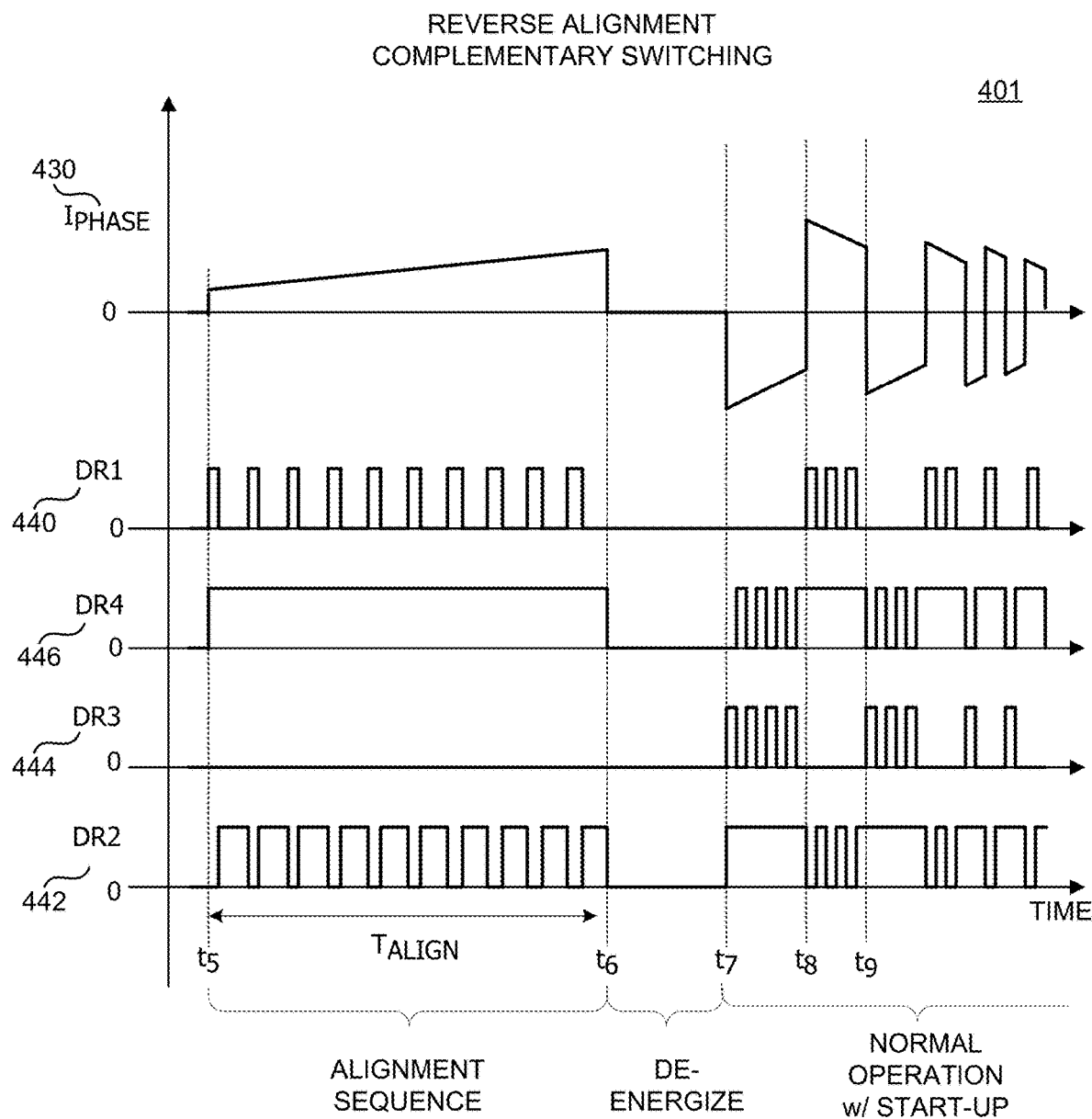
FIG. 4B is another timing diagram of example waveforms of the motor drive system of FIG. 3 utilizing complementary switching and the motor is in reverse alignment, in accordance with teachings of the present disclosure.
Figure 5B:
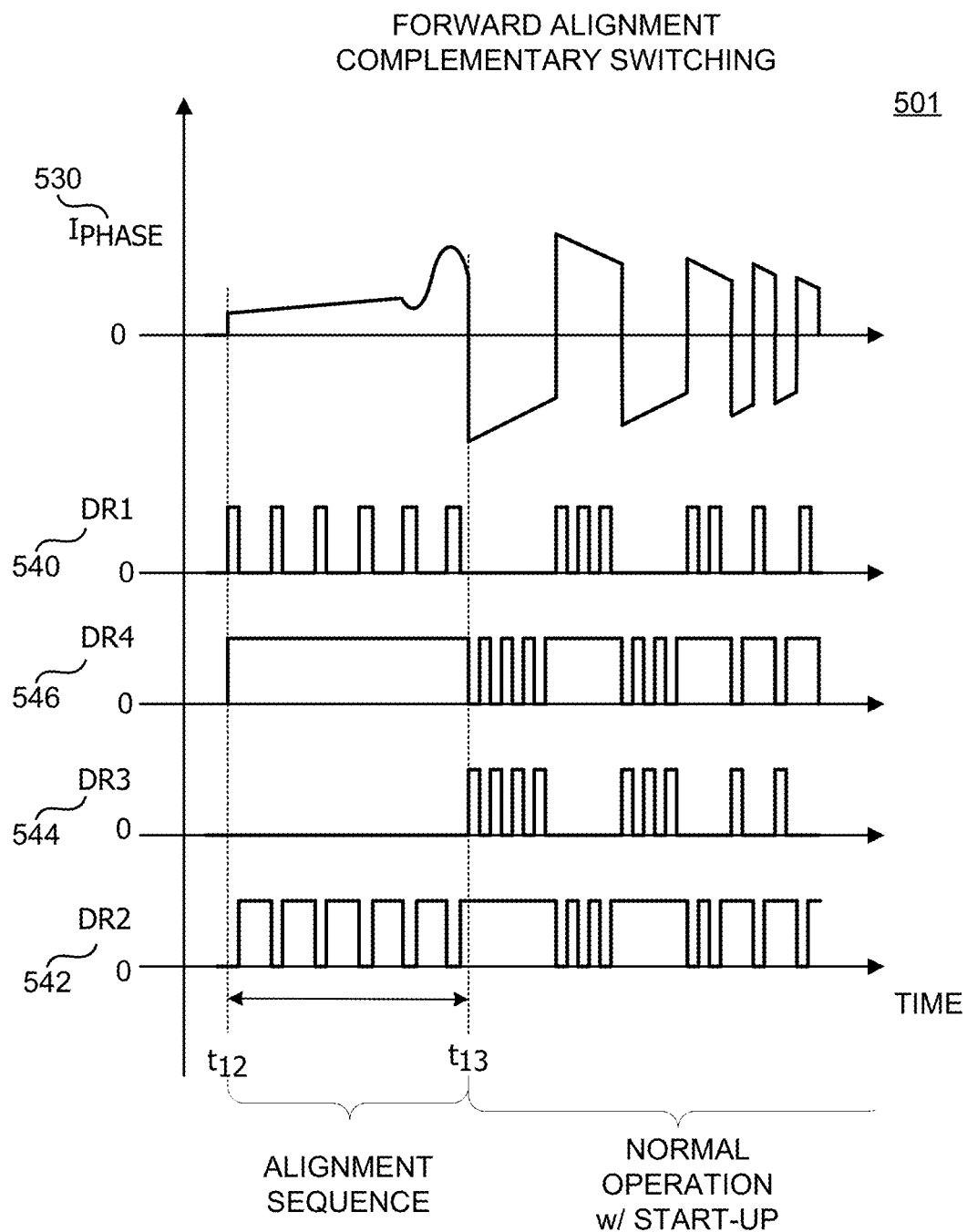
FIG. 5B is another timing diagram of example waveforms of the motor drive system of FIG. 3 utilizing complementary switching and the motor is in forward alignment, in accordance with teachings of the present disclosure.

In another embodiment, sometimes referred to as complementary switching and discussed with respect to FIGS. 4B and 5B, the system controller 328 sends control signals to the switch controllers such that power switch S3 314 is turned OFF while power switch S4 316 is turned ON for the entirety of the alignment sequence. Power switch S1 310 is turned ON with an increasing duty ratio during the alignment sequence. In one example, the duty ratio may increase from 2% to 5%. However, power switch S2 312 is turned ON and OFF complementary to power switch S1 310. In other words, when power switch S1 310 is ON, power switch S2 312 is OFF and vice versa.

When switch S2 312 is not used for complementary switching, the phase current $I_{PHASE}$ 330 freewheels through power switch S4 316 and the anti-parallel diode of power switch S2 312 when the power switch S1 310 turns OFF. In contrast, when switch S2 312 is used for complementary switching, the phase current $I_{PHASE}$ 330 freewheels through power switch S4 316 and the MOSFET of switch S2 312 rather than the anti-parallel diode. As such, there may be a reduction in conduction loss.

Similarly as above, it should be appreciated that the power switches may be controlled such that the direction of the phase current $I_{PHASE}$ 330 is from mid-point HB2 towards mid-point HB1. For that direction, the system controller 328 sends control signals to the switch controllers such that power switches S1 310 are turned OFF while power switch S2 312 is turned ON for the entirety of the alignment sequence. Power switch S3 314 is turned ON with an increasing duty ratio during the alignment sequence while power switch S4 316 is turned ON and OFF complementary to power switch S3 314.

System controller 328 ends the alignment sequence if first duration $T_{ALIGN}$ has elapsed or if the system controller 328 senses a decrease and/or dip in the phase current $I_{PHASE}$ 330. In one example, system controller 328 tracks the maximum of the received phase current sense signal 329, representative of the phase current $I_{PHASE}$ 330. For example, the system controller 328 initially samples the phase current sense signal 329 and saves the initial sample of the phase current sense signal 329 and replaces the maximum value if the current sample is greater than the previous sample. If the current sample falls below the maximum value by a threshold amount, the system controller 328 determines that a decrease or dip has occurred, indicating that the motor 326 is near the goal alignment position. In one example, the threshold amount is 20 milliamperes (mA).

As such, the motor drive system 300 with the system controller 328 aligns the rotor of the motor 326 with the stator to the goal alignment position by applying the alignment duty ratio control to at least one of the power switches for either the first duration $T_{ALIGN}$ or until a decrease and/or dip is sensed in the phase current $I_{PHASE}$ 330.

FIG. 4A illustrates a timing diagram 400 with example waveforms of the phase current $I_{PHASE}$ 430, drive signal DR1 440, drive signal DR2 442, drive signal DR3 444, and drive signal DR4 446 of a motor drive system with motor alignment control. It should be appreciated that the phase current $I_{PHASE}$ 430, drive signal DR1 440, drive signal DR2 442, drive signal DR3 444, and drive signal DR4 446 of FIG. 4A are one example of phase current $I_{PHASE}$ 330, drive signal DR1 340, drive signal DR2 342, drive signal DR3 344, and drive signal DR4 346 discussed with respect to FIG. 3 and similarly named and numbered elements couple and function as described above. In particular, FIG. 4A illustrates example waveforms for these signals during the alignment sequence if the motor is in reverse alignment as discussed with respect to FIG. 2C.

At time $t_0$, the system controller begins the alignment sequence to align the motor to the goal alignment position. System controller controls the power switches with an alignment duty ratio until the first duration $T_{ALIGN}$ has elapsed or a dip and/or decrease is sensed in the phase current $I_{PHASE}$ 430. For the example shown, power switch S1 310 and power switch S4 316 are utilized to align the motor to the goal alignment position. Drive signal DR3 444 and drive signal DR2 442 are low, and the power switches S3 314 and power switch S2 312 are OFF and remain OFF for the alignment sequence. Drive signal DR4 446 is high, and power switch S4 316 is ON and remains ON for the alignment sequence. Drive signal DR1 440 is shown as a rectangular pulse waveform of high and low sections to turn ON and turn OFF power switch S1 310. During the alignment sequence, the duration of the high sections of drive signal DR1 440 increases to illustrate that the power switch S1 310 is turned ON with an increasing duty ratio. For the example shown in FIG. 4A, the second value of the duty ratio is greater than the first value of the duty ratio. In one example, the first value may be 2% and the second value may be 5%, as such, the duty ratio for power switch S1 310 may increase from 2% to 5%. As a result, the phase current $I_{PHASE}$ 440 is increasing during the alignment sequence. The waveforms shown in FIG. 4A illustrate a motor which is in reverse alignment. For the example shown, the first duration $T_{ALIGN}$ has elapsed before a dip or decrease is sensed in the phase current $I_{PHASE}$ 440. As such, the alignment sequence ends at time $t_1$ and the duration between time $t_0$ and time $t_1$ is the first duration $T_{ALIGN}$.

Between times $t_1$ and $t_2$ is a de-energize sequence in which drive signal DR1 440, drive signal DR2 442, drive signal DR3 444, and drive signal DR4 446 are low, and all the power switches are turned OFF to de-energize the motor. De-energizing the motor may prevent the magnetics of the motor from saturating. In one example, the system controller implements a de-energize sequence if the alignment sequence ends because the first duration $T_{ALIGN}$ has elapsed. A de-energize sequence may follow the alignment sequence when the motor is in reverse alignment. In one example, the duration of the de-energizing sequence is substantially 500 milliseconds (ms).

At time $t_2$, the system controller implements start-up and normal operation of the motor occurs. During normal operation, the high-side switch of one half-bridge is paired with the low-side switch of the other half-bridge to control the direction of the phase current $I_{PHASE}$ 430 to alternate. This allows for the alternating the generated magnetic field by the motor windings (shown with respect to FIG. 1) which causes the rotor to rotate. For example, power switches S1 310 and S3 314 are high-side switches while power switches S2 312 and S4 316 are low-side switches. High-side switch S1 310 is paired with low-side switch S4 316 to control the direction of phase current $I_{PHASE}$ 430 from mid-point HB1 to mid-point HB2. Similarly, high-side switch S3 314 is paired with low-side switch S2 312 to control the direction of phase current $I_{PHASE}$ 430 from mid-point HB2 to mid-point HB1.

The low-side switches, e.g. power switches S2 312 and S4 316, may be considered polarity switches (or could be referred to as direction switches) as the turn ON and turn OFF of the low-side switches determines the direction of the phase current $I_{PHASE}$ 330. For example, if switch S2 312 is turned ON and switch S4 316 is turned OFF, the direction of the phase current $I_{PHASE}$ 430 is from mid-point HB2 towards mid-point HB1. If switch S2 312 is OFF and switch S4 316 is ON, the direction of the phase current $I_{PHASE}$ 430 is from mid-point HB1 towards mid-point HB2. The high-side switches, e.g. power switches S1 310 and S4 316, may be considered modulation switches as the turn ON and turn OFF of the high-side switches can control the magnitude of current provided to the motor 326 and ergo control the speed of the motor 326. The frequency of switching for the low-side switches, S2 312 and S4 316, is slower than the frequency of switching for the high-side switches, S1 310 and S3 314. As such, the low-side switches, S2 312 and S4 316, may also be referred to as low frequency switches while the high-side switches, S1 310 and S3 314, may be referred to as high frequency switches. During normal operation, the switching properties of the power switches, such as the on-time, off-time, the duty ratio, the switching frequency, or the number of pulses per unit time of the power switch, may be controlled to control the desired motion of the rotor shaft of the BLDC motor.

For the example shown, power switch S1 310 and power switch S4 316 were utilized for alignment control. As such, for start-up and normal operation, switches S2 312 and S3 314 are turned ON first at time $t_2$. If power switches S2 312 and S3 314 were used for alignment control, then power switches S1 310 and S3 316 would be turned on first for start-up and normal operation.

At time $t_2$, drive signal DR1 440 and drive signal DR4 446 are low and power switch S1 310 and power switch S4 316 are OFF. Drive signal DR2 442 is high and power switch S2 312 is ON. Further, drive signal DR3 444 transitions between high and low values to alternate the power switch S3 314 turning ON and turning OFF. As discussed above, the low-side switch, e.g. power switch S2 312, is the low frequency switch which determines direction of the phase current $I_{PHASE}$ 430 while the high-side switch, e.g. power switch S3 314, is the high frequency switch which controls the magnitude of the phase current $I_{PHASE}$ 430. As shown between times $t_2$ and $t_3$, the phase current $I_{PHASE}$ 430 is negative since the direction of the phase current $I_{PHASE}$ 430 is from mid-point HB2 to mid-point HB1.

It should be appreciated that the phase current $I_{PHASE}$ 430 is shown as a straight line approximation. The duration of time which the low-side switch, for this example, power switch S2 312 is on, is the duration of time it takes the rotor to move through one quadrant of the motor, as shown with respect to FIG. 1. As the motor speed increases, the duration of time which the low-side switch is ON would decrease.

At time $t_3$, the rotor has reached the next quadrant of the motor and system controller reverses the direction of current through the motor. Drive signals DR2 442 and DR3 444 are logic low and power switches S2 312 and S3 314 are OFF. Drive signal DR4 442 is high and power switch S4 316 is ON. Further, drive signal DR1 440 transitions between high and low values to alternate the power switch S1 310 turning ON and turning OFF. As discussed above, the low-side switch, e.g. power switch S4 316, is the low frequency switch which determines direction of the phase current $I_{PHASE}$ 430 while the high-side switch, e.g. power switch S1 310, is the high frequency switch which controls the magnitude of the phase current $I_{PHASE}$ 430. As shown between times $t_3$ and $t_4$, the phase current $I_{PHASE}$ 430 is positive since the direction of the phase current $I_{PHASE}$ 430 is from mid-point HB1 to mid-point HB2. The duration of time between time $t_3$ and time $t_4$ represents the amount of time it takes for the rotor to go through this next quadrant of the motor. At time $t_4$, the power switches are controlled to such that the direction of phase current $I_{PHASE}$ 430 is from mid-point HB1 to mid-point HB2, and operation is similar as the duration between time $t_2$ and $t_3$. During normal operation, the power switches are controlled such that the phase current $I_{PHASE}$ 430 alternates through the motor and the duration of time to alternate the high-side and low-sides switches may be determined by the duration of time the rotor takes to move through one quadrant of the motor.

FIG. 4B illustrates a timing diagram 401 with example waveforms of the phase current $I_{PHASE}$ 430, drive signal DR1 440, drive signal DR2 442, drive signal DR3 444, and drive signal DR4 446 of a motor drive system with motor alignment control. In particular, timing diagram 401 illustrates example waveforms of a motor drive system utilizing complementary switching. It should be appreciated that the phase current $I_{PHASE}$ 430, drive signal DR1 440, drive signal DR2 442, drive signal DR3 444, and drive signal DR4 446 of FIG. 4B are one example of phase current $I_{PHASE}$ 330, drive signal DR1 340, drive signal DR2 342, drive signal DR3 344, and drive signal DR4 346 discussed with respect to FIG. 3 and similarly named and numbered elements couple and function as described above. In particular, FIG. 4B illustrates example waveforms for these signals during the alignment sequence if the motor is in reverse alignment as discussed with respect to FIG. 2C and the motor drive system utilizes complementary switching. With complementary switching, one pair of high-side switches and low-side switches are utilized to control the direction and magnitude of the phase current $I_{PHASE}$ 430, however the other low-side switch is used to conduct freewheeling phase current $I_{PHASE}$ 430.

At time $t_5$, the system controller begins the alignment sequence to align the motor to the goal alignment position. System controller controls the power switches with the alignment duty ratio control until the first duration $T_{ALIGN}$ has elapsed or a dip and/or decrease is sensed in the phase current $I_{PHASE}$ 430. For the example shown, power switch S1 310 and power switch S4 316 are utilized to align the motor to the goal alignment position. Drive signal DR3 444 is low and the power switches S3 314 is OFF and remains OFF for the alignment sequence. Drive signal D2 442 is also low at time t4, and the power switch S2 312 is OFF, however, power switch S2 312 is switched complementary with the high-side power switch S1 310. Drive signal DR4 326 is high, and power switch S4 316 is ON and remains ON for the alignment sequence. Drive signal DR1 440 is shown as a rectangular pulse waveform of high and low sections to turn ON and turn OFF power switch S1 310. During the alignment sequence, the duration of the high sections of drive signal DR1 440 increases to illustrate that the power switch S1 310 is turned ON with an increasing duty ratio. In one example, the duty ratio for power switch S1 310 may increase from 2% to 5%. As a result, the phase current $I_{PHASE}$ 440 is increasing during the alignment sequence.

Further, the drive signal DR2 442 is the inverted drive signal DR1 410. When drive signal DR1 440 is high to control the high-side power switch S2 310 ON, the drive signal DR2 442 is low to control the low-side power switch S2 312 OFF, and vice versa. As such, power switch S2 312 is switched complementary to power switch S1 310. When switch S2 312 is used for complementary switching, the phase current $I_{PHASE}$ 430 freewheels through power switch S4 316 and the MOSFET of switch S2 312 and there may be a reduction in conduction loss. During the alignment sequence, the duration of the high sections of drive signal DR1 440 increases to illustrate that the power switch S1 310 is turned ON with an increasing duty ratio. As such, the power switch S2 312 is turned ON with decreasing duty ratio.

The waveforms shown in FIG. 4B illustrate a motor which is in reverse alignment. For the example shown, the first duration $T_{ALIGN}$ has elapsed before a dip or decrease is sensed in the phase current $I_{PHASE}$ 440. As such, the alignment sequence ends at time $t_6$ and the duration between time $t_5$ and time $t_6$ is the first duration $T_{ALIGN}$.

Between times $t_6$ and $t_7$ is a de-energize sequence in which drive signal DR1 440, drive signal DR2 442, drive signal DR3 444, and drive signal DR4 446 are low, and all the power switches are turned OFF to de-energize the motor. De-energizing the motor may prevent the magnetics of the motor from saturating. In one example, the duration of the de-energizing sequence is substantially 500 milliseconds (ms).

At time $t_7$, the system controller implements start-up and normal operation of the motor occurs. During normal operation, the high-side switch of one half-bridge is paired with the low-side switch of the other half-bridge to control the direction of the phase current $I_{PHASE}$ 430 to alternate. Further, the other low-side switch is turned ON and OFF complementary to the high-side switch. This allows for the alternating the generated magnetic field by the motor windings (shown with respect to FIG. 1) which causes the rotor to rotate. For example, power switches S1 310 and S3 314 are high-side switches while power switches S2 312 and S4 316 are low-side switches. High-side switch S1 310 is paired with low-side switch S4 316 to control the direction of phase current $I_{PHASE}$ 430 from mid-point HB1 to mid-point HB2. Similarly, high-side switch S3 314 is paired with low-side switch S2 312 to control the direction of phase current $I_{PHASE}$ 430 from mid-point HB2 to mid-point HB1. When high-side power switch S1 310 is paired with low-side power switch S4 316 to control the phase current $I_{PHASE}$ 430, then low-side power switch S2 312 is switched complementary to high-side power switch S1 310. When high-side power switch S3 314 is paired with low-side switch S2 312 to control the phase current $I_{PHASE}$ 430, then low-side power switch S4 316 is switched complementary to high-side power switch S3 314.

As mentioned above, the low-side switches, e.g. power switches S2 312 and S4 316, may be considered polarity switches (or could be referred to as direction switches) as the turn ON and turn OFF of the low-side switches determines the direction of the phase current $I_{PHASE}$ 330. The high-side switches, e.g. power switches S1 310 and S4 316, may be considered modulation switches as the turn ON and turn OFF of the high-side switches can control the magnitude of current provided to the motor 326 and ergo control the speed of the motor 326. During normal operation, the switching properties of the power switches, such as the on-time of the power switch, off-time, the duty ratio, the switching frequency, or the number of pulses per unit time of the power switch, may be controlled to control the desired motion of the rotor shaft of the BLDC motor.

For the example shown, power switch S1 310 and power switch S4 316 were utilized for alignment control. As such, for start-up and normal operation, switches S2 312 and S3 314 are turned ON first at time $t_7$. If power switches S2 312 and S3 314 were used for alignment control, then power switches S1 310 and S3 316 would be turned on first for start-up and normal operation.

At time $t_7$, drive signal DR1 440 is low and power switch S1 310 is OFF. Drive signal DR2 442 is high and power switch S2 312 is ON. Further, drive signal DR3 444 transitions between high and low values to alternate the power switch S3 314 turning ON and turning OFF. As discussed above, the low-side switch, e.g. power switch S2 312, is the low frequency switch which determines direction of the phase current $I_{PHASE}$ 430 while the high-side switch, e.g. power switch S3 314, is the high frequency switch which controls the magnitude of the phase current $I_{PHASE}$ 430. As shown between times $t_7$ and $t_8$, the phase current $I_{PHASE}$ 430 is negative since the direction of the phase current $I_{PHASE}$ 430 is from mid-point HB2 to mid-point HB1. Further, drive signal DR4 446 is the inverted drive signal DR3 444 and power switch S4 316 is switched complementary with power switch S3 314. In other words, between time $t_7$ and time $t_8$, when power switch S3 314 is controlled ON, power switch S4 316 is controlled OFF and vice versa. The duration of time which the low-side switch, for this example, power switch S2 312 is ON, is substantially the duration of time it takes the rotor to move through one quadrant, e.g. the distance from pole-to-pole) of the motor, as shown with respect to FIG. 1. As the motor speed increases, the duration of time which the low-side switch is ON would decrease.

At time $t_8$, the rotor has reached the next quadrant of the motor and system controller reverses the direction of current through the motor. Drive signals DR3 444 is low and power switches S3 314 is OFF. Drive signal DR4 442 is high and power switch S4 316 is ON. Further, drive signal DR1 440 transitions between high and low values to alternate the power switch S1 310 turning ON and turning OFF. As discussed above, the low-side switch, e.g. power switch S4 316, is the low frequency switch which determines direction of the phase current $I_{PHASE}$ 430 while the high-side switch, e.g. power switch S1 310, is the high frequency switch which controls the magnitude of the phase current $I_{PHASE}$ 430. As shown between times $t_8$ and $t_9$, the phase current $I_{PHASE}$ 430 is positive since the direction of the phase current $I_{PHASE}$ 430 is from mid-point HB1 to mid-point HB2. The duration of time between time $t_8$ and time $t_9$ represents the amount of time it takes for the rotor to move through this next quadrant of the motor. Similarly to above, drive signal DR2 442 is the inverted drive signal DR1 440 and power switch S2 312 is switched complementary with power switch S1 310. In other words, between time $t_8$ and time $t_9$, when power switch S1 310 is controlled ON, power switch S2 312 is controlled OFF and vice versa.

At time $t_9$, the power switches are controlled such that the direction of phase current $I_{PHASE}$ 430 is from mid-point HB1 to mid-point HB2, and operation is similar as the duration between time $t_7$ and $t_8$. During normal operation, the power switches are controlled such that the phase current $I_{PHASE}$ 430 alternates through the motor and the duration of time to alternate the high-side and low-sides switches may be determined by the duration of time the rotor takes to move through one quadrant of the motor.

FIG. 5A illustrates a timing diagram 500 with example waveforms of the phase current $I_{PHASE}$ 530, drive signal DR1 540, drive signal DR2 542, drive signal DR3 544, and drive signal DR4 546 of a motor drive system with motor alignment control. It should be appreciated that the phase current $I_{PHASE}$ 530, drive signal DR1 540, drive signal DR2 542, drive signal DR3 544, and drive signal DR4 546 of FIG. 5A are one example of phase current $I_{PHASE}$ 330, drive signal DR1 340, drive signal DR2 342, drive signal DR3 344, and drive signal DR4 346 discussed with respect to FIG. 3 and similarly named and numbered elements couple and function as described above. In particular, FIG. 5A illustrates example waveforms for these signals during the alignment sequence if the motor is in forward alignment as discussed with respect to FIG. 2B.

It should be appreciated that the waveforms shown in FIG. 5A shares many similarities as the example waveforms shown with respect to FIG. 4A. In FIG. 5A, start-up and normal operation begin at time $t_{11}$ onwards, and is substantially similar to the start-up and normal operation discussed with respect to FIG. 4A. At least one difference, however, is during the alignment sequence of FIG. 5A.

At time $t_{10}$, the system controller begins the alignment sequence to align the motor to the goal alignment position. System controller controls the power switches having an alignment duty ratio control until the first duration $T_{ALIGN}$ has elapsed or a dip and/or decrease is sensed in the phase current $I_{PHASE}$ 530. For the example shown, power switch S1 310 and power switch S4 316 are utilized to align the motor to the goal alignment position. Drive signal DR3 544 and drive signal DR2 542 are low, and the power switches S3 314 and power switch S2 312 are OFF and remain OFF for the alignment sequence. Drive signal DR4 526 is high, and power switch S4 316 is ON and remains ON for the alignment sequence. Drive signal DR1 540 is shown as a rectangular pulse waveform of high and low sections to turn ON and turn OFF power switch S1 310. During the alignment sequence, the duration of the high sections of drive signal DR1 540 increases to illustrate that the power switch S1 310 is turned ON with an increasing duty ratio. In one example, the duty ratio for power switch S1 310 may increase between a first value and a second value. In one example, the first value is substantially 2% while the second value is substantially 5%.

The waveforms shown in FIG. 5A illustrate a motor which is in forward alignment. The phase current $I_{PHASE}$ 540 is shown as generally increasing. As the rotor reaches the goal alignment position, a quasi-sinusoidal shape can be sensed in the phase current $I_{PHASE}$ 540 due to the back-EMF of the motor. For the example shown, before a dip or decrease is sensed in the phase current $I_{PHASE}$ 440 prior to the end of the first duration $T_{ALIGN}$. As such, the alignment sequence ends at time $t_{11}$ and the duration between time $t_{10}$ and time $t_{11}$ is less than the first duration $T_{ALIGN}$.

In forward alignment, there is no de-energizing sequence and start-up and normal operation follows the alignment sequence. At time $t_{11}$, the system controller implements start-up and normal operation of the motor occurs. During normal operation, the high-side switch of one half-bridge is paired with the low-side switch of the other half-bridge to control the direction of the phase current $I_{PHASE}$ 530 to alternate. This allows for the alternating the generated magnetic field by the motor windings (shown with respect to FIG. 1) which causes the rotor to rotate. For example, power switches S1 310 and S3 314 are high-side switches while power switches S2 312 and S4 316 are low-side switches. High-side switch S1 310 is paired with low-side switch S4 315 to control the direction of phase current $I_{PHASE}$ 530 from mid-point HB1 to mid-point HB2. Similarly, high-side switch S3 314 is paired with low-side switch S2 312 to control the direction of phase current $I_{PHASE}$ 430 from mid-point HB2 to mid-point HB1. During normal operation, the switching properties of the power switches, such as the on-time of the power switch, off-time, the duty ratio, the switching frequency, or the number of pulses per unit time of the power switch, may be controlled to control the desired motion of the rotor shaft of the BLDC motor.

FIG. 5B illustrates a timing diagram 501 with example waveforms of the phase current $I_{PHASE}$ 530, drive signal DR1 540, drive signal DR2 542, drive signal DR3 544, and drive signal DR4 546 of a motor drive system with motor alignment control. It should be appreciated that the phase current $I_{PHASE}$ 530, drive signal DR1 540, drive signal DR2 542, drive signal DR3 544, and drive signal DR4 546 of FIG. 5B are one example of phase current $I_{PHASE}$ 330, drive signal DR1 340, drive signal DR2 342, drive signal DR3 344, and drive signal DR4 346 discussed with respect to FIG. 3 and similarly named and numbered elements couple and function as described above. In particular, FIG. 5B illustrates example waveforms for these signals during the alignment sequence if the motor is in forward alignment as discussed with respect to FIG. 2B.

It should be appreciated that the waveforms shown in FIG. 5B shares many similarities as the example waveforms shown with respect to FIG. 4B. In FIG. 5B, start-up and normal operation begin at time $t_{13}$ onwards, and is substantially similar to the start-up and normal operation discussed with respect to FIG. 4B. At least one difference, however, is during the alignment sequence of FIG. 5B. Further, the waveforms shown in FIG. 5B are similar to those shown with respect to FIG. 5A, however, the power switches are complementary switched.

At time $t_{12}$, the system controller begins the alignment sequence to align the motor to the goal alignment position. System controller controls the power switches with the alignment duty ratio control until the first duration $T_{ALIGN}$ has elapsed or a dip and/or decrease is sensed in the phase current $I_{PHASE}$ 530. For the example shown, power switch S1 310 and power switch S4 316 are utilized to align the motor to the goal alignment position. Drive signal DR3 544 is low and the power switch S3 314 is OFF and remains OFF for the alignment sequence. Drive signal DR4 526 is high, and power switch S4 316 is ON and remains ON for the alignment sequence. Drive signal DR1 540 is shown as a rectangular pulse waveform of high and low sections to turn ON and turn OFF power switch S1 310. During the alignment sequence, the duration of the high sections of drive signal DR1 540 increases to illustrate that the power switch S1 310 is turned ON with an increasing duty ratio. Further, power switch S2 312 is switched complementary with the high-side power switch S1 310. As such, drive signal DR2 542 is the inverted drive signal DR1 540.

The waveforms shown in FIG. 5B illustrate a motor which is in forward alignment. The phase current $I_{PHASE}$ 540 is shown as generally increasing. As the rotor reaches the goal alignment position, a quasi-sinusoidal shape can be sensed in the phase current $I_{PHASE}$ 540 due to the back-EMF of the motor. For the example shown, before a dip or decrease is sensed in the phase current $I_{PHASE}$ 540 prior to the end of the first duration $T_{ALIGN}$. As such, the alignment sequence ends at time $t_{13}$ and the duration between time $t_{12}$ and time $t_{13}$ is less than the first duration $T_{ALIGN}$.

Similar to above, there is no de-energizing sequence for forward alignment and start-up and normal operation follows the alignment sequence. Since the alignment sequence ended due to a sensed dip and/or decrease in the phase current $I_{PHASE}$ 540, the system controller proceeds directly to start-up and normal operation. At time $t_{13}$, start-up and normal operation of the motor occurs. During normal operation, the high-side switch of one half-bridge is paired with the low-side switch of the other half-bridge to control the direction of the phase current $I_{PHASE}$ 530 to alternate. This allows for the alternating the generated magnetic field by the motor windings (shown with respect to FIG. 1) which causes the rotor to rotate. For example, power switches S1 310 and S3 314 are high-side switches while power switches S2 312 and S4 316 are low-side switches. High-side switch S1 310 is paired with low-side switch S4 315 to control the direction of phase current $I_{PHASE}$ 530 from mid-point HB1 to mid-point HB2. Further, low-side side S2 312 is switched complementary with the high-side switch S1 310. Similarly, high-side switch S3 314 is paired with low-side switch S2 312 to control the direction of phase current $I_{PHASE}$ 430 from mid-point HB2 to mid-point HB1 while low-side switch S4 316 is switched complementary with high-side switch S3 314.

FIG. 6 illustrates a flow diagram 600 of motor alignment control. The process begins at block 605, in which the device is turned on. At block 610, the alignment sequence begins. At block 615, the power switch is turned on having an alignment duty ratio control. In one example, alignment duty ratio control refers to controlling the turn ON and OFF of at least one power switch with a duty ratio between a first value and a second value. The first and second value are selected to reduce or minimize the effects of wobbling or other undesired alignment response. In one example, the first value is selected to not be too high such that the rotor will not overshoot the goal alignment position. Too high of a first value could cause overshoot of the rotor to the goal alignment position. Further, the second value is selected to be high enough to pull the rotor forward into the goal alignment position. In one example, the second value is greater than the first value and the duty ratio increases for the alignment duty ratio control. In another example, the first and second value are substantially equal. It should be appreciated that the values selected for the first and second value may depend on the application. For the motor shown in FIGS. 1, 2A, 2B, and 2C, the duty ratio may increase from 2%-5%. Or in other words, the first value is substantially 2% while the second value is substantially 5%. Further, the high-side power switch may be utilized for alignment duty ratio control.

The process proceeds to decision block 620. Block 620 determines if a decrease is sensed in the phase current. If a dip/decrease is sensed, the process proceeds to block 635 and start-up and normal operation begins. If no dip/decrease is sensed, the process proceeds to decision block 625. Block 625 determines if the first duration $T_{ALIGN}$ has elapsed. If the first duration $T_{ALIGN}$ has not elapsed, the process returns to decision block 620. If the first duration $T_{ALIGN}$ has elapsed the process proceeds to block 630 where the motor is de-energized. The process then proceeds to block 635 and start-up and normal operation begins.

Figure 7:
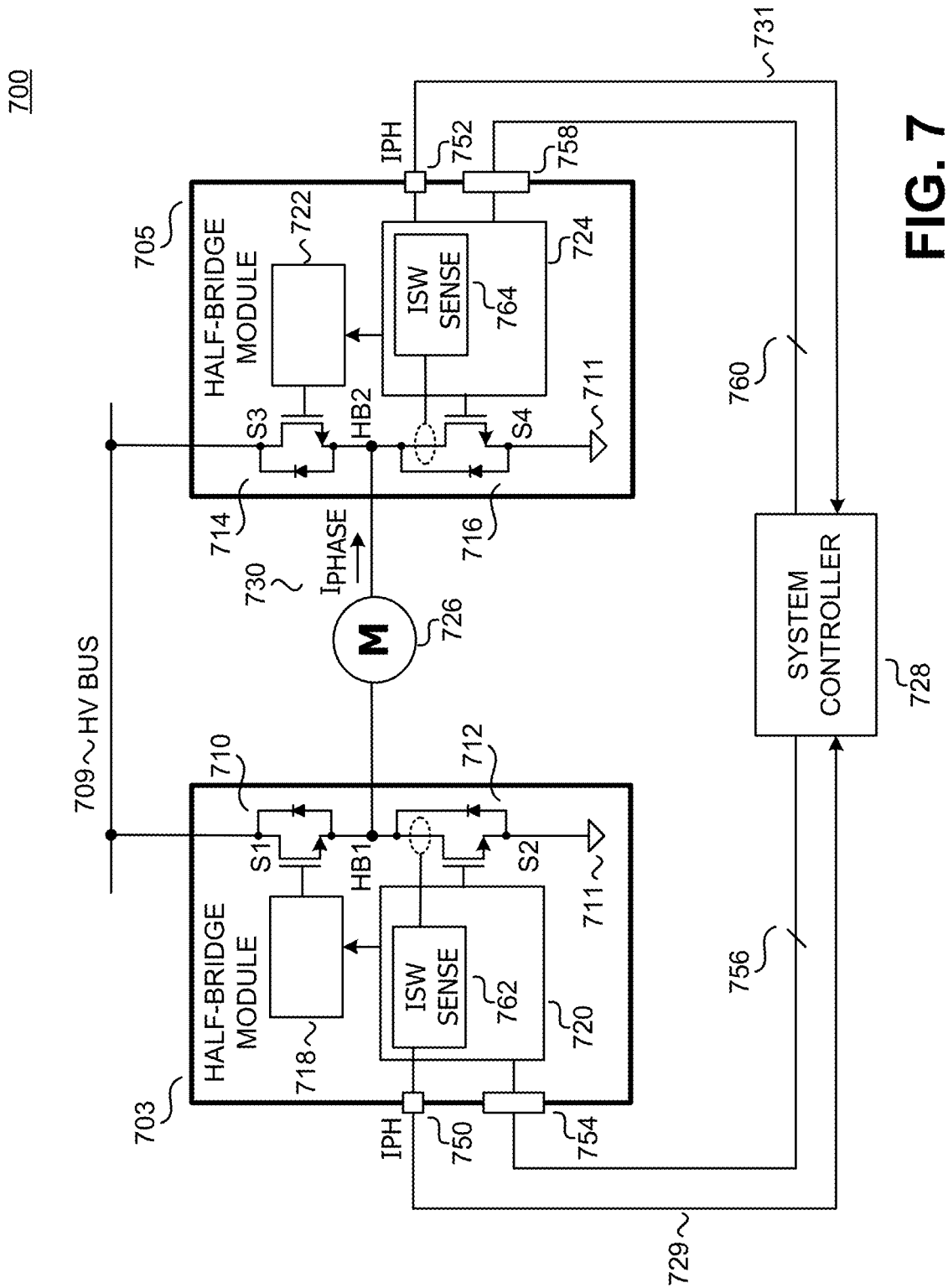
FIG. 7 is an example motor drive system with motor alignment control, in accordance with teachings of the present disclosure.

FIG. 7 illustrates an example motor drive system 700 with motor alignment control including half-bridge module 703, half-bridge module 705, motor 726, and system controller 728. As shown in FIG. 7, motor 726 is a single-phase BLDC motor. Half-bridge module 703 is shown as including a high-side (HS) power switch S1 710, low-side (LS) power switch S2 712, HS switch controller 718, and LS switch controller 720. Switch controller 720 further includes a current sense circuit 762. Similarly, half-bridge module 705 includes HS power switch S3 714, LS power switch S4 716, HS switch controller 722, and LS switch controller 724. Switch controller 724 includes current sense circuit 764. It should be appreciated that similarly named and numbered elements couple and function as described above. In particular, FIG. 7 illustrates that the switch controllers and power switches discussed previously can be integrated into half-bridge modules.

Half-bridge module 703 includes a terminal to couple to the HV bus 709. Half-bridge module 703 also includes power switches S1 710 and S2 712 coupled together in a half-bridge configuration between HV bus 709 and return 711. The mid-point HB1 of the half-bridge is coupled to motor 726. Switch controllers 718, 720 are configured to output drive signals to power switches S1 710, S2 712 to control the turn ON and turn OFF of these power switches, respectively.

Low-side switch controller 720 includes current sense circuit 762 which is configured to receive the current of the LS power switch S2 712. In one example, current sense circuit 762 receives the drain current of the LS power switch S2 712. The sensed switch current of the LS power switch S2 712 may be representative of the phase current $I_{PHASE}$ 730 of motor 726 when power switch S2 712 is conducting. As such, the current sense circuit 762 outputs the phase current sense signal 729 representative of the phase current $I_{PHASE}$ 730 of motor 726. In particular, the current sense circuit 762 senses the negative phase current $I_{PHASE}$ 730 of motor 726 and the phase current sense signal 729 is representative of the negative phase current $I_{PHASE}$ 730. The phase current sense signal 729 is one example of phase current sense signal 329. The half-bridge module 703 includes current sense terminal IPH 750 which provides the phase current sense signal 729 to system controller 728.

Similarly, half-bridge module 705 includes a terminal to couple to the HV bus 709. Half-bridge module 705 also includes power switches S3 714 and S4 716 coupled together in a half-bridge configuration between HV bus 709 and return 711. The mid-point HB2 of the half-bridge is coupled to motor 726. Switch controllers 722, 724 are configured to output drive signals to power switches S3 714, S4 716 to control the turn ON and turn OFF of these power switches, respectively.

Low-side switch controller 724 includes current sense circuit 764 which is configured to receive the current of the LS power switch S4 716. In one example, current sense circuit 764 receives the drain current of the LS power switch S4 716. The sensed switch current of the LS power switch S4 716 may be representative of the phase current $I_{PHASE}$ 730 of motor 726 when power switch S4 716 is conducting. As such, the current sense circuit 764 outputs the phase current sense signal 731 representative of the phase current $I_{PHASE}$ 730 of motor 726. In particular, the current sense circuit 764 senses the positive phase current $I_{PHASE}$ 730 of motor 726 and the phase current sense signal 731 is representative of the positive phase current $I_{PHASE}$ 730. The phase current sense signal 731 is one example of phase current sense signal 329. The half-bridge module 705 includes current sense terminal IPH 752 which provides the phase current sense signal 731 to system controller 728. The embodiment shown in FIG. 7 includes two half-bridge modules 703, 705 which both provide phase current sense signals 729, 731 to the system controller 728.

System controller 728 is configured to exchange control signals with half-bridge module 703 via communication bus 756 and with half-bridge module 705 via communication bus 706. Example control signals include command signals to turn ON or turn OFF power switches S1 710, S2 712, S3 714, and S4 716, and fault signals indicating overcurrent or overvoltage faults, however it should be appreciated that other signals could be communicated. For the example shown, half-bridge module 703 includes a communication terminal 754 and the LS switch controller 720 receives the control signals from the system controller 728. Further, LS switch controller 720 includes communication circuits and is configured to communicate the applicable control signals from the system controller 728 to the HS switch controller 718. Similarly, half-bridge module 705 includes a communication terminal 758 and the LS switch controller 724 receives the control signals from the system controller 728. Further, LS switch controller 724 includes communication circuits and is configured to communicate the applicable control signals from the system controller 728 to the HS switch controllers 722.

System controller 728 receives the sensed phase current signals 729, 731 and applies motor alignment control as discussed previously. In the example shown, the phase current sense signal 731 outputted from the terminal IPH 752 is representative of the positive phase current $I_{PHASE}$ 730 while the phase current sense signal 729 outputted from the terminal IPH 750 is representative of the negative phase current $I_{PHASE}$ 730. In embodiments, during the alignment sequence, the system controller 728 controls the duty ratio of at least one of the power switches to increase the phase current $I_{PHASE}$ 730 in a controlled manner. For the example shown, system controller 728 increases the duty ratio of power switch S1 710 while controlling the power switch S4 716 ON. As a result, the phase current $I_{PHASE}$ increases with the increasing duty ratio of power switch S1 310 and the direction of phase current $I_{PHASE}$ is from mid-point HB1 towards mid-point HB2. System controller 728 ends the alignment sequence if first duration $T_{ALIGN}$ has elapsed or if the system controller 728 senses a decrease and/or dip in the phase current $I_{PHASE}$ 730 from phase current sense signals 729 or 731. In another example, the system controller 728 senses a decrease and/or dip in the phase current $I_{PHASE}$ 730 from phase current sense signal 731. As such, the motor drive system 700 with the system controller 728 aligns the rotor of the motor 726 with the stator to the goal alignment position by applying an alignment duty ratio control to at least one of the power switches for either the first duration $T_{ALIGN}$ or until a decrease and/or dip is sensed in the phase current $I_{PHASE}$ 330.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1. A motor drive system for use with a motor, comprising a first high-side switch coupled to a high voltage bus and the motor; a first low-side switch coupled to the motor and a return, wherein a turn ON and turn OFF of the first high-side switch and the first low-side switch provides a phase current for the motor; and a system controller configured to receive a phase current sense signal representative of the phase current of the motor and further configured to begin an alignment sequence to align the motor to a goal alignment position, wherein during the alignment sequence at least one of the first high-side switch or the first low-side switch is turned ON and OFF having an alignment duty ratio, and the system controller is configured to end the alignment sequence in response to a sensed decrease in the phase current sense signal or a first duration has elapsed.

Example 2. The motor drive system of example 1, wherein the system controller begins a normal operation sequence after the end of the alignment sequence.

Example 3. The motor drive system of examples 1 or 2, wherein the system controller implements a de-energize sequence to de-energize the motor between the end of the alignment sequence and the normal operation sequence if the system controller ended the alignment sequence in response to the first duration.

Example 4. The motor drive system of any one of examples 1 to 3, wherein the system controller is configured to turn ON the other of the first high-side switch or the first low-side switch for the entirety of the alignment sequence.

Example 5. The motor drive system of any one of examples 1 to 4, further comprising: a second high-side switch coupled to the high voltage bus and the motor; and a second low-side switch coupled to the motor and the return, wherein the system controller is configured to turn ON and OFF the second high-side switch, the second low-side switch, the first high-side switch, and the first low-side switch to alternate a direction of the phase current of the motor.

Example 6. The motor drive system of any one of examples 1 to 5, wherein the system controller is configured to control at least one of the second low-side switch or the second high-side switch ON and OFF complementarily to the at least one of the first high-side switch or the first low-side switch being turned ON and OFF having the alignment duty ratio.

Example 7. The motor drive system of any one of examples 1 to 6, further comprising: a first half-bridge module comprising the first high-side switch, the second low-side switch and a first current sense circuit, wherein the first current sense circuit is configured to sense a second low-side switch current and output a first current sense signal representative of negative phase current of the motor; and a second half-bridge module comprising the second high-side switch, the first low-side switch and a second current sense circuit, wherein the second current sense circuit is configured to sense a first low-side switch current and output a second current sense signal representative of positive phase current of the motor, and wherein the system controller is configured to receive the first current sense signal and the second current sense signal as the phase current sense signal.

Example 8. The motor drive system of any one of examples 1 to 7, wherein the alignment sequence occurs for the first duration when the motor is in a reverse alignment from the goal alignment position.

Example 9. The motor drive system of any one of examples 1 to 8, wherein the alignment sequence ends in response to the sensed decrease in the phase current sense signal when the motor is in a forward alignment from the goal alignment position.

Example 10. The motor drive system of any one of examples 1 to 9, wherein the system controller is configured to compare a maximum value of the phase current sense signal to a current value of the phase current sense signal to sense the decrease in the phase current sense signal.

Example 11. The motor drive system of any one of examples 1 to 10, wherein the system controller controls the alignment duty ratio of at least one of the first high-side switch or the first low-side switch between a first value and a second value, wherein the first value and the second value are selected to reduce an undesired alignment response of the motor.

Example 12. The motor drive system of any one of examples 1 to 11, wherein the first value is substantially 2% and the second value is substantially 5%.

Example 13. A method for aligning a motor to a goal alignment position, comprising beginning an alignment sequence; turning ON a power switch with a duty ratio between a first value and a second value to generate a phase current of the motor; monitoring the phase current of the motor; monitoring a duration of the alignment sequence; and ending the alignment sequence in response to monitoring the phase current of the motor or in response to monitoring the duration of the alignment sequence.

Example 14. The method of example 13, further comprising detecting a decrease in the monitored phase current.

Example 15. The method of example 13 or 14, wherein ending the alignment sequence in response to monitoring the phase current further comprises ending the alignment sequence in response to the detected decrease in the monitored phase current.

Example 16. The method of any one of examples 13 to 15, wherein detecting the decrease in the monitored phase current further comprises comparing a maximum value of the monitored phase current to a current value of the monitored phase current.

Example 17. The method of any one of examples 13 to 16, further comprising determining that the duration of the alignment sequence is substantially equal to a first duration.

Example 18. The method of any one of examples 13 to 17, wherein ending the alignment sequence in response to monitoring the duration of the alignment sequence further comprises ending the alignment sequence in response to determining that the duration of the alignment sequence is substantially equal to the first duration.

Example 19. The method of any one of examples 13 to 18, wherein turning ON a power switch with a duty ratio between the first value and the second value to generate the phase current of the motor further comprises increasing the duty ratio between the first value and a second value such that the phase current increases.

What is claimed is:

1. A motor drive system for use with a motor, comprising:
a first high-side switch coupled to a high voltage bus and the motor;
a first low-side switch coupled to the motor and a return, wherein a turn ON and turn OFF of the first high-side switch and the first low-side switch provides a phase current for the motor; and a system controller configured to receive a phase current sense signal representative of the phase current of the motor and further configured to begin an alignment sequence to align the motor to a goal alignment position, wherein during the alignment sequence at least one of the first high-side switch or the first low-side switch is turned ON and OFF under the control of an alignment duty ratio, and the system controller is configured to end the alignment sequence and begin a normal operation sequence in response to a sensed decrease in an envelope of the phase current sense signal, the system controller is configured to compare a sample of the phase current sense signal to a previous sample of the phase current sense signal to track the phase current sense signal and to determine a maximum value of the phase current, wherein the system controller is further configured to compare the maximum value of the phase current sense signal to the sample of the phase current sense signal to sense the decrease in the envelope of the phase current sense signal.

2. The motor drive system of claim 1, wherein the system controller begins the normal operation sequence after the end of the alignment sequence.

3. The motor drive system of claim 2, wherein the system controller is further configured to end the alignment sequence in response to an elapse of a first duration, wherein the system controller is configured to implement a de-energize sequence to de-energize the motor between the end of the alignment sequence and the normal operation sequence if the system controller ended the alignment sequence in response to the first duration.

4. The motor drive system of claim 1, wherein the system controller is configured to turn ON the other of the first high-side switch or the first low-side switch for the entirety of the alignment sequence.

5. The motor drive system of claim 4, further comprising:
a second high-side switch coupled to the high voltage bus and the motor; and
a second low-side switch coupled to the motor and the return, wherein the system controller is configured to turn ON and OFF the second high-side switch, the second low-side switch, the first high-side switch, and the first low-side switch to alternate a direction of the phase current of the motor.

6. The motor drive system of claim 5, wherein the system controller is configured to control at least one of the second low-side switch or the second high-side switch ON and OFF complementarily to the at least one of the first high-side switch or the first low-side switch being turned ON and OFF under the control of the alignment duty ratio.

7. The motor drive system of claim 5, further comprising:
a first half-bridge module comprising the first high-side switch, the second low-side switch and a first current sense circuit,
wherein the first current sense circuit is configured to sense a second low-side switch current and output a first current sense signal representative of negative phase current of the motor; and
a second half-bridge module comprising the second high-side switch, the first low-side switch and a second current sense circuit,
wherein the second current sense circuit is configured to sense a first low-side switch current and output a second current sense signal representative of positive phase current of the motor, and
wherein the system controller is configured to receive the first current sense signal and the second current sense signal as the phase current sense signal.

8. The motor drive system of claim 1, wherein the alignment sequence occurs for a first duration when the motor is in a reverse alignment from the goal alignment position.

9. The motor drive system of claim 1, wherein the alignment sequence ends in response to the sensed decrease in the envelope of the phase current sense signal when the motor is in a forward alignment from the goal alignment position.

10. The motor drive system of claim 1, wherein the system controller controls the alignment duty ratio of at least one of the first high-side switch or the first low-side switch between a first value and a second value, wherein the first value and the second value are selected to reduce an undesired alignment response of the motor.

11. The motor drive system of claim 10, wherein the first value is substantially 2% and the second value is substantially 5%.

12. The motor drive system of claim 1, wherein the envelope of the sensed phase current has a substantially sinusoidal shape when the sensed decrease in the envelope of the monitored phase current occurs.

13. The motor drive system of claim 1, wherein the system controller is configured to sense the decrease in the envelope of the phase current sense signal in response to the sample of the phase current sense signal falling below the maximum value by a threshold amount.

14. A method for aligning a motor to a goal alignment position, comprising:
beginning an alignment sequence;
turning ON a power switch with a duty ratio between a first value and a second value to generate a phase current of the motor;
monitoring the phase current of the motor;
monitoring a duration of the alignment sequence; and
ending the alignment sequence and beginning a normal operation sequence in response to detecting a decrease in an envelope of the monitored phase current of the motor, wherein detecting the decrease in the envelope of the monitored phase current further comprises:
tracking a maximum value of the monitored phase current by comparing a sample of the monitored phase current to a previous sample of the monitored phase current; and
comparing the maximum value of the monitored phase current to the sample of the monitored phase current.

15. The method of claim 14, further comprising determining that the duration of the alignment sequence is substantially equal to a first duration.

16. The method of claim 15, wherein ending the alignment sequence in response to monitoring the duration of the alignment sequence further comprises ending the alignment sequence in response to determining that the duration of the alignment sequence is substantially equal to the first duration.

17. The method of claim 14, wherein turning ON a power switch with a duty ratio between the first value and the second value to generate the phase current of the motor further comprises increasing the duty ratio between the first value and a second value such that the envelope of the phase current increases.

18. The method of claim 14, wherein detecting the decrease in the envelope of the monitored phase current further comprises determining the sample of the monitored phase current is less than the maximum value by a threshold amount.

19. The method of claim 14, wherein the envelope of the monitored phase current has a substantially sinusoidal shape when detecting the decrease in the monitored phase current.

* * * * *